US012774406B2

(12) United States Patent
Shaaban et al.

(10) Patent No.: US 12,774,406 B2
(45) Date of Patent: Oct. 27, 2026

(54) CURABLE PRECURSOR OF A THERMALLY-CONDUCTIVE ADHESIVE COMPOSITION

(71) Applicant: 3M INNOVATIVE PROPERTIES COMPANY, St. Paul, MN (US)

(72) Inventors: Ahmad Shaaban, Cologne (DE); Adrian Jung, Kaarst (DE); Manfred Ludsteck, Geretsried (DE); Adrian Eckert, Herrsching (DE); Li Yao, Woodbury, MN (US); Simon Plugge, Düsseldorf (DE); Lingjie Tong, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1389 days.

(21) Appl. No.: 17/607,279

(22) PCT Filed: Apr. 22, 2020

(86) PCT No.: PCT/IB2020/053819

§ 371 (c)(1),
(2) Date: Oct. 28, 2021

(87) PCT Pub. No.: WO2020/225638

PCT Pub. Date: Nov. 12, 2020

(65) Prior Publication Data

US 2022/0243102 A1 Aug. 4, 2022

(30) Foreign Application Priority Data

May 6, 2019 (EP) .................................... 19172815

(51) Int. Cl.

| | |
|---|---|
| ***C09J 133/08*** | (2006.01) |
| ***C08F 220/06*** | (2006.01) |
| ***C08F 220/18*** | (2006.01) |
| ***C08F 220/28*** | (2006.01) |
| ***C08F 222/10*** | (2006.01) |

(Continued)

(52) U.S. Cl.

CPC ........... *C09J 133/08* (2013.01); *C08F 220/06* (2013.01); *C08F 220/1804* (2020.02); *C08F 220/1808* (2020.02); *C08F 220/1811* (2020.02); *C08F 220/285* (2020.02); *C08F 222/102* (2020.02); *C08F 230/02* (2013.01); *C08K 3/22* (2013.01);

(Continued)

(58) Field of Classification Search

CPC .......... C08F 20/02; C08F 20/10; C08F 20/14; C08F 20/18; C08F 120/02; C08F 120/10; C08F 120/14; C08F 120/08; C08F 220/18; C08F 220/1802; C08F 220/1803; C08F 220/1804; C08F 220/05; C08F 220/1806; C08F 220/1807; C08F 220/1808; C08F 220/1809; C08F 220/1811; C08F 220/1812; C08F 220/1818; C08L 33/08; C08L 33/10; C08L 33/12; C09J 133/08; C09J 133/10; C09J 133/12

See application file for complete search history.

(56) References Cited

U.S. PATENT DOCUMENTS

| | | | |
|---|---|---|---|
| 8,163,835 | B2 | 4/2012 | Park |
| 2005/0228097 | A1 | 10/2005 | Zhong |

(Continued)

FOREIGN PATENT DOCUMENTS

| | | |
|---|---|---|
| CN | 107556949 | 1/2018 |
| CN | 107880822 | 4/2018 |

(Continued)

OTHER PUBLICATIONS

Mocjizuki, "Adhesive compositions for temporary bonding of electronic chips", Chemical Abstracts, Jan. 1992, No. 4, p. 74, XP000282440.

(Continued)

*Primary Examiner* — Jeffrey S Lenihan

(74) *Attorney, Agent, or Firm* — Carlos M. Téllez Rodríguez

(57) ABSTRACT

The present disclosure relates to a curable precursor of an adhesive composition, comprising: a) a (meth)acrylate-based (co)polymer base component comprising the free-radical (co)polymerization reaction product of a (co)polymerizable material comprising: i. $C_1$-$C_{32}$ acrylic acid ester monomer units; ii. optionally, $C_1$-$C_{18}$ methacrylic acid ester monomer units; and iii. optionally, ethylenically unsaturated monomer units having a functional group and which are copolymerizable with monomer units (i) and/or (ii); b) a crosslinker for the (meth)acrylate-based (co)polymer base component, which comprises at least one acid-functional group derived from phosphoric acid and at least one free-radical (co)polymerizable reactive group; c) a polyether oligomer having a number average molecular weight of at least 2000 g/mol and which comprises at least one free-radical (co)polymerizable reactive group; and d) a thermally conductive particulate material. According to another aspect, the present disclosure is directed to a curing system suitable for such curable precursor. According to still another aspect, the present disclosure relates to a method of manufacturing such curable precursor. In yet another aspect, the disclosure relates to the use of such curable precursor for industrial applications, in particular for thermal management applications in the automotive industry.

9 Claims, 3 Drawing Sheets

(51) Int. Cl.
*C08F 230/02* (2006.01)
*C08K 3/22* (2006.01)
*C09J 133/10* (2006.01)

(52) U.S. Cl.
CPC ..... *C09J 133/10* (2013.01); *C08K 2003/2227* (2013.01)

(56) References Cited

U.S. PATENT DOCUMENTS

| | | | |
|---|---|---|---|
| 2007/0142528 A1 | 6/2007 | Oshima | |
| 2009/0061244 A1* | 3/2009 | Dershem | C08F 290/061 156/332 |
| 2010/0035494 A1 | 2/2010 | Okada | |

FOREIGN PATENT DOCUMENTS

| | | |
|---|---|---|
| EP | 1698664 | 9/2006 |
| EP | 3127973 | 2/2017 |
| JP | 4832658 | 10/2002 |
| JP | 2005325314 | 11/2005 |
| WO | WO 2004-056932 | 7/2004 |
| WO | WO 2005-047412 | 5/2005 |
| WO | WO2008-038734 | 4/2008 |

OTHER PUBLICATIONS

International Search Report for PCT International Application No. PCT/IB2020/053819, mailed on Jun. 25, 2020, 4 pages.

* cited by examiner

CURABLE PRECURSOR OF A THERMALLY-CONDUCTIVE ADHESIVE COMPOSITION

CROSS REFERENCE TO RELATED APPLICATIONS

This application is a national stage filing under 35 U.S.C. 371 of PCT/IB2020/053819, filed Apr. 22, 2020, which claims the benefit of European Application No. 19172815.3, filed May 6, 2019, the disclosures of which are incorporated by reference in their entireties herein.

TECHNICAL FIELD

The present disclosure relates generally to the field of curable compositions, more specifically to the field of thermally-conductive curable compositions comprising a (meth) acrylate-based (co)polymer. The present disclosure is further directed to a method of manufacturing a curable composition and to the use of a curable composition for industrial applications, in particular for thermal management applications in the automotive industry.

BACKGROUND

Curable compositions have been known for years as suitable for use in a variety of applications that include general-use industrial applications such as adhesives and coatings, as well as high-performance applications in the electronics industry such as e.g. for sealing and bonding electronic components.

With broadened use of curable compositions over the years, performance requirements have become more and more demanding with respect to, in particular, curing profile, adhesion performance, storage stability, handleability and processability characteristics, and compliance with environment and health requirements. When curable compositions are additionally required to provide thermal conductivity, the technical challenge of formulating suitable compositions becomes even more stringent.

Examples of curable compositions provided with thermal conductivity are described in e.g. US-A1-2007/0142528 (Oshima et al.), US-A1-2010/0035494 (Okada et al.) and US-A1-2005/0228097 (Zhong). The curable compositions described in the art are typically not fully satisfactory for providing good workability and processability in their uncured state (due in particular to unsuitable rheological characteristics), whilst providing excellent thermal conductivity as well as good adhesion and mechanical properties (in particular flexibility) in their fully cured state.

Without contesting the technical advantages associated with the partial solutions known in the art, there is still a need for a curable precursor of an adhesive composition which overcomes the above-mentioned deficiencies.

SUMMARY

According to one aspect, the present disclosure relates to a curable precursor of an adhesive composition, comprising:

a) a (meth)acrylate-based (co)polymer base component comprising the free-radical (co)polymerization reaction product of a (co)polymerizable material comprising:
  i. $C_1$-$C_{32}$ (meth)acrylic acid ester monomer units;
  ii. optionally, $C_1$-$C_{18}$ methacrylic acid ester monomer units; and iii. optionally, ethylenically unsaturated monomer units having a functional group and which are copolymerizable with monomer units (i) and/or (ii);
b) a crosslinker for the (meth)acrylate-based (co)polymer base component, which comprises at least one acid-functional group derived from phosphoric acid and at least one free-radical (co)polymerizable reactive group;
c) a polyether oligomer having a number average molecular weight of at least 2000 g/mol and which comprises at least one free-radical (co)polymerizable reactive group; and
d) a thermally conductive particulate material.

According to another aspect, the present disclosure is directed to a curing system suitable for a curable precursor of an adhesive composition comprising a polyether oligomer having a number average molecular weight of at least 2000 g/mol and which comprises at least one free-radical (co) polymerizable reactive group, wherein the curing system comprises a crosslinker comprising at least one acid-functional group derived from phosphoric acid and at least one free-radical (co)polymerizable reactive group.

In still another aspect of the present disclosure, it is provided a method of manufacturing a curable precursor of an adhesive composition, comprising the steps of:

a) providing a (meth)acrylate-based (co)polymer base component comprising the free-radical (co)polymerization reaction product of a (co)polymerizable material comprising $C_1$-$C_{32}$ acrylic acid ester monomer units;
b) providing a polyether oligomer having a number average molecular weight of at least 2000 g/mol and which comprises at least one free-radical (co)polymerizable reactive group;
c) providing a crosslinker for the (meth)acrylate-based (co)polymer base component, which comprises at least one acid-functional group derived from phosphoric acid and at least one free-radical (co)polymerizable reactive group; and
d) combining the base component, the polyether oligomer and the crosslinker.

According to yet another aspect, the present disclosure relates to the use of a curable composition as described above, for industrial applications, in particular for thermal management applications in the automotive industry.

DETAILED DESCRIPTION

Figure 1:
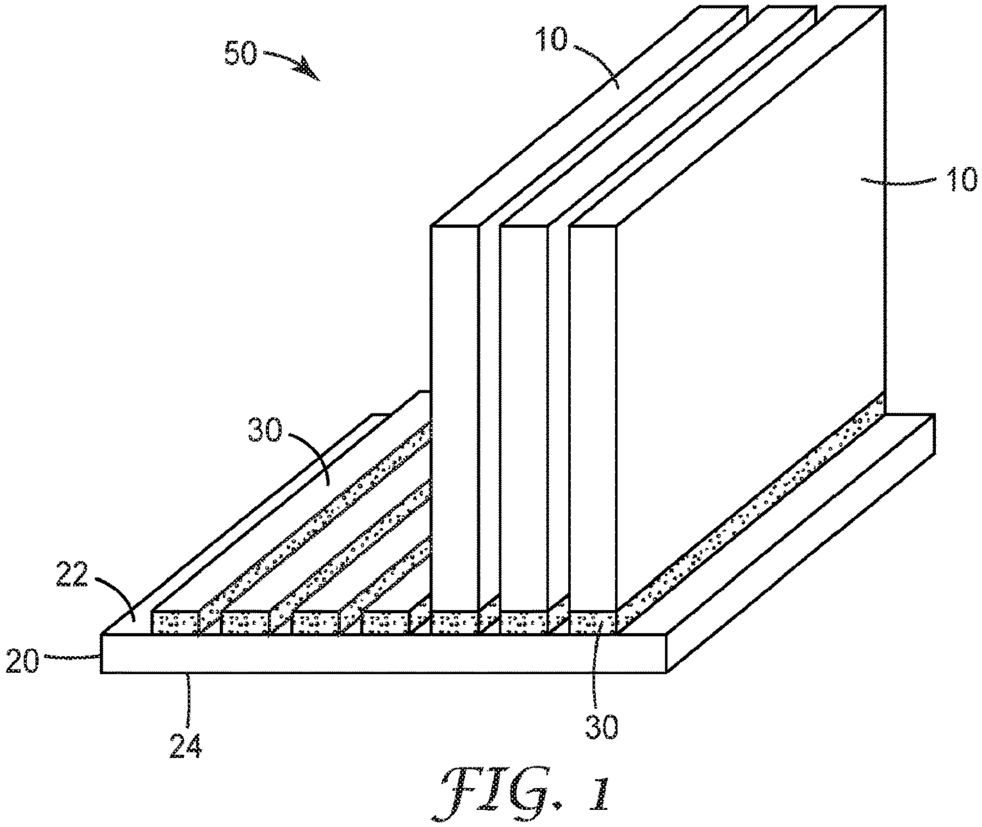
FIG. 1 illustrates the assembly of an exemplary battery module according to one aspect of the present disclosure.

According to a first aspect, the present disclosure relates to a curable precursor of an adhesive composition, comprising:

a) a (meth)acrylate-based (co)polymer base component comprising the free-radical (co)polymerization reaction product of a (co)polymerizable material comprising:

i. $C_1$-$C_{32}$ (meth)acrylic acid ester monomer units;
ii. optionally, $C_1$-$C_{18}$ methacrylic acid ester monomer units; and
iii. optionally, ethylenically unsaturated monomer units having a functional group and which are copolymerizable with monomer units (i) and/or (ii);

b) a crosslinker for the (meth)acrylate-based (co)polymer base component, which comprises at least one acid-functional group derived from phosphoric acid and at least one free-radical (co)polymerizable reactive group;
c) a polyether oligomer having a number average molecular weight of at least 2000 g/mol and which comprises at least one free-radical (co)polymerizable reactive group; and
d) a thermally conductive particulate material.

In the context of the present disclosure, it has been surprisingly found that a curable precursor as described above is particularly suitable for manufacturing an adhesive composition provided with excellent characteristics and performance as to adhesion, thermal conductivity and mechanical properties (in particular structural strength, flexibility and elasticity) in its fully cured state, whilst the curable precursor provides outstanding characteristics relating to workability and processability (such as e.g. mixing properties, pumpability, flowability, extrudability, applicability, coatability) in its uncured state.

This is a particularly unexpected finding as (meth)acrylate (co)polymer-based curable precursors are generally recognized as leading to challenging viscosity characteristics when used in combination with thermally conductive particulate material. These challenging viscosity characteristics would have been intuitively expected to detrimentally affect not only the workability and processability characteristics of the curable precursor, but also its curing characteristics. The above-detailed finding is all the more surprising as the unique and balanced combination of uncured/cured material properties met by the curable precursor of the present description are somehow self-contradicting.

The curable precursors as described above are further characterized by one or more of the following advantageous benefits: (i) easy and cost-effective manufacturing method, based on readily available starting materials and minimized manufacturing steps; (ii) formulation simplicity and versatility; (iii) ability to efficiently cure without the need for any substantial energy input such as elevated temperature or actinic radiation; (iv) ability to efficiently cure without the need to use volatile adjuvants, in particular water; (v) safe handling due to non-use of material or products having detrimental effects to the human body; (vi) storage and ageing stability; and (vii) ability to use conventional static mixing equipment for dispensing the curable precursor.

Without wishing to be bound by theory, it is believed that these excellent characteristics and performance attributes are due in particular to the presence of a specific combination of: (a) the (meth)acrylate-based (co)polymer base component; (b) the crosslinker for the (meth)acrylate-based (co)polymer base component; (c) the polyether oligomer; and (d) thermally conductive particulate material. Still without wishing to be bound by theory, it is believed that this specific combination of components together contributes to provide the curable precursor with advantageous and unique rheological and thixotropic characteristics, in particular viscosity properties, in combination with excellent curing characteristics, in particular, curing efficiency, curing kinetics and curing profile.

As such, the curable precursor of the present disclosure is outstandingly suitable for thermal management applications in the automotive industry, in particular for the manufacturing of a thermally-conductive gap filler composition which may advantageously be used in the manufacturing of battery modules. Advantageously still, the curable precursor of the disclosure is suitable for automated handling and application, in particular by fast robotic equipment, due in particular to its excellent curing characteristics, mechanical properties (in particular flexibility) and dimensional stability.

In the context of the present disclosure, the expression "thermally-conductive gap filler composition" is meant to designate a thermally-conductive composition that is used to at least partially fill a spatial gap between a first and a second surface. Thermally-conductive gap filler compositions are well known to those skilled in the art.

In the context of the present disclosure, the expression "free-radical curable precursor" is meant to designate a composition which can be cured using an initiator containing or able to produce a free-radical. The term "initiator" is meant to refer to a substance or a group of substances able to start or initiate or contribute to the curing process of the curable precursor.

The terms "glass transition temperature" and "Tg" are used interchangeably and refer to the glass transition temperature of a (co)polymeric material or a mixture. Unless otherwise indicated, glass transition temperature values are estimated by the Fox equation, as detailed hereinafter.

In the context of the present disclosure, the expression "high Tg (meth)acrylic acid ester monomer units" is meant to designate (meth)acrylic acid ester monomer units having a Tg of above 50° C., as a function of the homopolymer of said high Tg monomers. The expression "low Tg (meth)acrylic acid ester monomer units" is meant to designate (meth)acrylic acid ester monomer units having a Tg of below 20° C., as a function of the homopolymer of said low Tg monomers.

The term "alkyl" refers to a monovalent group which is a saturated hydrocarbon. The alkyl can be linear, branched, cyclic, or combinations thereof and typically has 1 to 32 carbon atoms. In one particular aspect, the alkyl group contains 1 to 25, 1 to 20, 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, 2-ethylhexyl, 2-octyl and 2-propylheptyl.

The curable precursor of the present disclosure comprises, as a first component, a (meth)acrylate-based (co)polymer base component comprising the free-radical (co)polymerization reaction product of a (co)polymerizable material comprising:

i. $C_1$-$C_{32}$ (meth)acrylic acid ester monomer units;
ii. optionally, $C_1$-$C_{18}$ methacrylic acid ester monomer units; and
iii. optionally, ethylenically unsaturated monomer units having a functional group and which are copolymerizable with monomer units (i) and/or (ii).

In a particular aspect of the disclosure, the $C_1$-$C_{32}$ (meth)acrylic acid ester monomer units are selected from the group consisting of linear or branched $C_1$-$C_{32}$ (meth)acrylic acid ester monomer units, $C_1$-$C_{24}$ (meth)acrylic acid ester monomer units, or even $C_1$-$C_{18}$ (meth)acrylic acid ester monomer units.

In an advantageous aspect, the $C_1$-$C_{32}$ (meth)acrylic acid ester monomer units for use in the (meth)acrylate-based (co)polymer base component are selected from the group consisting of iso-octyl (meth)acrylate, 2-ethylhexyl (meth)

acrylate, 2-propylheptyl (meth)acrylate, butyl (meth)acrylate, and any mixtures thereof.

In a more advantageous aspect, the $C_1$-$C_{32}$ (meth)acrylic acid ester monomer units are selected from the group consisting of 2-ethylhexyl (meth)acrylate, n-butyl (meth) acrylate, and any mixtures thereof.

In another advantageous aspect, the $C_1$-$C_{32}$ (meth)acrylic acid ester monomer units have no functional groups.

In a typical aspect, the $C_1$-$C_{32}$ (meth)acrylic acid ester monomer units are different from the optional $C_1$-$C_{18}$ methacrylic acid ester monomer units and different from the optional ethylenically unsaturated monomer units having a functional group and which are copolymerizable with monomer units (i) and/or (ii).

In an exemplary aspect, the (meth)acrylate-based (co) polymer base component for use herein comprises the copolymerization reaction product of a copolymerizable material comprising from 45 to 99 wt. %, from 50 to 99 wt. %, from 60 to 99 wt. %, from 70 to 98 wt. %, from 80 to 98 wt. %, from 85 to 98 wt. %, or even from 90 to 98 wt. % of the $C_1$-$C_{32}$ (meth)acrylic acid ester monomer units, wherein the weight percentages are based on the total weight of the (meth)acrylate-based (co)polymer base component.

According to an advantageous aspect of the disclosure, the (meth)acrylate-based (co)polymer base component for use herein further comprises $C_1$-$C_{18}$ methacrylic acid ester monomer units.

Without wishing to be bound by theory, it is believed that the presence of $C_1$-$C_{18}$ methacrylic acid ester monomer units in the (meth)acrylate-based (co)polymer base component beneficially impacts its shear strength and cohesion properties.

In one exemplary aspect, the $C_1$-$C_{18}$ methacrylic acid ester monomer units for use herein are selected from the group consisting of methyl methacrylate, ethyl methacrylate, propyl methacrylate, n-butyl methacrylate, t-butyl methacrylate, isobutyl methacrylate, n-hexyl methacrylate, tetrahydrofurfuryl methacrylate, cyclohexyl methacrylate, 3,3,5-trimethylcyclohexyl methacrylate, tert-butyl cyclohexyl methacrylate, heptyl methacrylate, cycloheptyl methacrylate, 2-ethyhexyl methacrylate, n-octyl methacrylate, 2-phenoxy ethyl methacrylate, nonyl methacrylate, decyl methacrylate, lauryl methacrylate, isobornyl methacrylate, phenyl methacrylate, benzyl methacrylate, and any mixtures thereof.

According to an advantageous aspect, the $C_1$-$C_{18}$ methacrylic acid ester monomer units for use herein are selected from the group consisting of 2-ethyhexyl methacrylate, isodecyl methacrylate, isotridecanol methacrylate, methacrylic ester 17.4, ethyltriglycol methacrylate, 2-dimethyl aminoethyl methacrylate, and any mixtures thereof.

According to a more advantageous aspect, the $C_1$-$C_{18}$ methacrylic acid ester monomer units for use herein are selected to comprise 2-ethyhexyl methacrylate.

In an exemplary aspect, the (meth)acrylate-based (co) polymer base component for use herein comprises the copolymerization reaction product of a copolymerizable material comprising from 1 to 15 wt. %, from 2 to 12 wt. %, from 3 to 10 wt. %, from 4 to 10 wt. %, or even from 5 to 10 wt. %, of the $C_1$-$C_{18}$ methacrylic acid ester monomer units, wherein the weight percentages are based on the total weight of the (meth)acrylate-based (co)polymer base component.

In one advantageous aspect of the present disclosure, the $C_1$-$C_{18}$ methacrylic acid ester monomer units for use in the (meth)acrylate-based copolymeric additive herein have no functional groups.

According to one beneficial aspect of the disclosure, the (meth)acrylate-based (co)polymer base component for use herein further comprises ethylenically unsaturated monomer units having a functional group and which are copolymerizable with monomer units (i) and/or (ii).

Without wishing to be bound by theory, it is believed that the presence of ethylenically unsaturated monomer units having a functional group in the (meth)acrylate-based (co) polymer base component beneficially impacts its shear strength and adhesion properties. In some particular aspects of the disclosure, the ethylenically unsaturated monomer units having a functional group are believed to provide advantageous surface interactions with the thermally conductive particulate material, which in turn contribute to provide advantageous rheological profile to the curable precursor of the present disclosure.

In one beneficial aspect of the disclosure, the ethylenically unsaturated monomer units having a functional group and for use herein have a functional group selected from the group consisting of acid, amine, hydroxyl, amide, isocyanate, acid anhydride, epoxide, nitrile, and any combinations thereof.

According to a more beneficial aspect of the disclosure, the ethylenically unsaturated monomer units having a functional group have a functional group selected from the groups of acid groups, in particular carboxylic acids.

According to another beneficial aspect of the disclosure, the ethylenically unsaturated monomer units having a functional group are selected from the group consisting of (meth)acrylic acid, methoxyethyl (meth)acrylate, ethoxyethyl (meth)acrylate, 2-hydroxyethyl (meth)acrylate, 2-aminoethyl (meth)acrylate, dimethylaminoethyl (meth)acrylate, diethylaminoethyl (meth)acrylate, N-vinyl pyrrolidone, N-vinyl caprolactam, (meth)acrylamide, N-vinylacetamide, maleic anhydride, 4-acryloyl morpholine, glycidyl (meth) acrylate, 2-isocyanato ethyl (meth)acrylate, tert-butylamino ethyl (meth)acrylate, acrylonitrile, and any mixtures thereof.

According to particularly beneficial aspect of the disclosure, the ethylenically unsaturated monomer units having a functional group for use herein are selected to comprise acrylic acid.

In an exemplary aspect, the (meth)acrylate-based (co) polymer base component for use herein comprises the copolymerization reaction product of a copolymerizable material comprising from 1 to 15 wt. %, from 2 to 12 wt. %, from 3 to 10 wt. %, from 4 to 10 wt. %, or even from 5 to 10 wt. %, of the ethylenically unsaturated monomer units having a functional group, wherein the weight percentages are based on the total weight of the (meth)acrylate-based (co)polymer base component.

In a typical aspect of the present disclosure, the $C_1$-$C_{32}$ (meth)acrylic acid ester monomer units, the $C_1$-$C_{18}$ methacrylic acid ester monomer units and the ethylenically unsaturated monomer units having a functional group are mutually self-excluding. Accordingly, any of those monomer unit types cannot qualify as the other monomer unit types.

According to a particular aspect of the curable precursor according to the disclosure, the (meth)acrylate-based (co) polymer base component comprises the copolymerization reaction product of a copolymerizable material comprising:

i. from 45 to 99 wt. %, from 50 to 99 wt. %, from 60 to 99 wt. %, from 70 to 98 wt. %, from 80 to 98 wt. %, from 85 to 98 wt. %, or even from 90 to 98 wt. % of the $C_1$-$C_{32}$ (meth)acrylic acid ester monomer units;

ii. optionally, from 1 to 15 wt. %, from 2 to 12 wt. %, from 3 to 10 wt. %, from 4 to 10 wt. %, or even from 5 to 10 wt. %, of the $C_1$-$C_{18}$ methacrylic acid ester monomer units; and iii. optionally, from 1 to 15 wt. %, from 2 to 12 wt. %, from 3 to 10 wt. %, from 4 to 10 wt. %, or even from 5 to 10 wt. %, of the ethylenically unsaturated monomer units having a functional group;

wherein the weight percentages are based on the total weight of the (meth)acrylate-based (co)polymer base component.

In an exemplary aspect of the disclosure, the curable precursor comprises from 1 to 15 wt. %, from 2 to 12 wt. %, from 3 to 10 wt. %, from 4 to 10 wt. %, or even from 5 to 10 wt. %, of the (meth)acrylate-based (co)polymer base component, wherein the weight percentages are based on the total weight of the curable precursor.

The curable precursor of the present disclosure further comprises a crosslinker for the (meth)acrylate-based (co) polymer base component, which comprises at least one acid-functional group derived from phosphoric acid and at least one free-radical (co)polymerizable reactive group.

Crosslinkers for use herein are not particularly limited, as long as they fulfill the above-detailed requirements. Suitable crosslinkers for use herein may be easily identified by those skilled in the art in the light of the present disclosure.

Without wishing to be bound by theory, it is believed that the presence of the crosslinker as described above not only provides excellent curing characteristics to the curable precursor (in particular curing efficiency, advantageous curing kinetics and curing profile, and ability to efficiently cure without the need for any substantial energy input such as elevated temperature or actinic radiation), but also beneficially impacts its adhesion properties, due in particular to its excellent surface wetting properties provided in particular by the acid-functional group derived from phosphoric acid. The crosslinker as described above is also believed to provide advantageous surface interactions with the thermally conductive particulate material (in particular, at least partial coating of the conductive particular material), which in turn contribute to provide advantageous rheological properties to the curable precursor of the present disclosure. This particular surface interaction between the crosslinker and thermally conductive particulate material is believed to contribute in preventing, or at least substantially reducing, the sedimentation or settling of the thermally conductive particulate material in the curable precursor. Further, the crosslinker for use herein is also believed to beneficially impact the shear strength and mechanical properties of the fully cured adhesive composition.

In a typical aspect of the disclosure, the crosslinker for use herein is a free-radical crosslinker.

According to one advantageous aspect of the disclosure, the crosslinker for use herein comprises at least two acid-functional groups derived from phosphoric acid.

According to another advantageous aspect of the crosslinker for use herein, the at least one acid-functional group derived from phosphoric acid comprises at least one P—OH group.

In still another advantageous aspect of the crosslinker for use herein, the at least one acid-functional group derived from phosphoric acid is selected from the group consisting of monoesters of phosphoric acid, diesters of phosphoric acid, diesters of diphosphoric acid, and any combinations or mixtures thereof.

In yet another advantageous aspect of the crosslinker for use herein, the at least one acid-functional group derived from phosphoric acid is selected from the group consisting of monoesters of phosphoric acid and $C_1$-$C_6$ polyol derivatives, diesters of phosphoric acid and $C_1$-$C_6$ polyol derivatives, diesters of diphosphoric acid and $C_1$-$C_6$ polyol derivatives, and any combinations or mixtures thereof.

According to one preferred aspect of the disclosure, the crosslinker for use herein comprises at least one acid-functional group derived from phosphoric acid is selected from the group consisting of monoesters of phosphoric acid and derivatives of 1,3-isomer of glycerol, diesters of phosphoric acid and derivatives of 1,3-isomer of glycerol, diesters of diphosphoric acid and derivatives of 1,3-isomer of glycerol, and any combinations or mixtures thereof.

According to another preferred aspect of the disclosure, the crosslinker for use herein comprises at least one acid-functional group derived from phosphoric acid is selected from the group consisting of monoesters of phosphoric acid and derivatives of 1,2-isomer of glycerol, diesters of phosphoric acid and derivatives of 1,2-isomer of glycerol, diesters of diphosphoric acid and derivatives of 1,2-isomer of glycerol, and any combinations or mixtures thereof.

In an advantageous aspect of the disclosure, the crosslinker for the (meth)acrylate-based (co)polymer base component comprises at least two free-radical (co)polymerizable reactive groups.

According to a preferred aspect, the crosslinker for use in the present disclosure comprises at least one free-radical (co)polymerizable reactive group selected from the group consisting of ethylenically unsaturated groups.

In a more preferred aspect of the disclosure, the ethylenically unsaturated groups comprised in the crosslinker are selected from the group consisting of (meth)acrylic groups, vinyl groups, styryl groups, and any combinations or mixtures thereof. More preferably, the ethylenically unsaturated groups are selected from the group consisting of methacrylic groups, acrylic groups, and any combinations or mixtures thereof.

In a particularly preferred aspect of the disclosure, the ethylenically unsaturated groups comprised in the crosslinker are selected from the group of methacrylic groups.

Advantageously, the crosslinker for use herein is an ethylenically unsaturated compound.

According to a particularly preferred aspect, the crosslinker for use in the present disclosure comprises the reaction product(s) of the reaction of phosphoric acid with either 1,3-glycerol dimethacrylate or 1,2-glycerol dimethacrylate.

According to another particularly preferred aspect, the crosslinker for use in the present disclosure is selected from the group consisting of 1,3-glycerol dimethacrylate phosphate monoester, 1,2-glycerol dimethacrylate phosphate monoester, 1,3-glycerol dimethacrylate phosphate diester, 1,2-glycerol dimethacrylate phosphate diester, 1,3-glycerol dimethacrylate diphosphate diester, 1,2-glycerol dimethacrylate diphosphate diester, and any mixtures thereof.

In an exemplary aspect, the curable precursor of the present disclosure comprises from 0.01 to 10 wt. %, from 0.01 to 8 wt. %, from 0.05 to 6 wt. %, from 0.05 to 5 wt. %, from 0.05 to 4 wt. %, from 0.1 to 2 wt. %, or even from 0.1 to 1 wt. %, of the crosslinker for the (meth)acrylate-based (co)polymer base component, wherein the weight percentages are based on the total weight of the curable precursor.

In an advantageous aspect of the present disclosure, the crosslinker for the (meth)acrylate-based (co)polymer base component is (co)polymerizable with monomer units (i) and/or (ii) and/or (iii) of the (meth)acrylate-based (co) polymer base component.

The curable precursor of the present disclosure further comprises a polyether oligomer having a number average molecular weight of at least 2000 g/mol and which comprises at least one free-radical (co)polymerizable reactive group. Unless otherwise indicated, the number average molecular weight of the polyether oligomer for use herein is determined by conventional gel permeation chromatography (GPC) using appropriate techniques well known to those skilled in the art.

Polyether oligomers for use herein are not particularly limited, as long as they fulfill the above-detailed requirements. Suitable polyether oligomers for use herein may be easily identified by those skilled in the art in the light of the present disclosure.

Without wishing to be bound by theory, it is believed that the polyether oligomer as described above formerly acts as a reactive diluent and rheological modifier for the curable precursor, which contributes to provide the curable precursor with outstanding flexibility characteristics. The polyether oligomer is also believed to beneficially impact the adhesion properties of the curable precursor, due in particular to the beneficial surface wetting properties provided in particular by the oligomeric polyether moiety. The polyether oligomer as described above is also believed to provide advantageous surface interactions with the thermally conductive particulate material, which in turn contribute to enable relatively high loading of thermally conductive particulate material due in particular to the improved compatibility provided between the thermally conductive particulate material and the surrounding (meth)acrylate-based polymeric matrix. Further, the polyether oligomer for use herein is also believed to beneficially impact the shear strength, due in particular to the light crosslinking effect provided by the free-radical (co)polymerizable reactive group(s), and to provide beneficial ageing stability and hydrolytic stability.

In a beneficial aspect of the disclosure, the polyether oligomer having a number average molecular weight of at least 2000 g/mol comprises a (linear) polyether backbone and further comprises at least one free-radical (co)polymerizable reactive group.

In another beneficial aspect of the disclosure, the polyether oligomer for use herein has a number average molecular weight greater than 2000 g/mol, greater than 2500 g/mol, greater than 3000 g/mol, greater than 3500 g/mol, or even greater than 4000 g/mol.

In still another beneficial aspect of the disclosure, the polyether oligomer for use herein has a number average molecular weight greater no greater than 10.000 g/mol, no greater than 9500 g/mol, no greater than 9000 g/mol, no greater than 8500 g/mol, or even no greater than 8000 g/mol.

In yet another beneficial aspect of the disclosure, the polyether oligomer for use herein has a number average molecular weight in a range from 2000 to 20.000 g/mol, from 2000 to 15.000 g/mol, from 2000 to 12.000 g/mol, from 2500 to 10.000 g/mol, from 2500 to 9.000 g/mol, from 3000 to 8500 g/mol, from 3500 to 8000 g/mol or even from 4000 to 8000 g/mol.

According to an advantageous aspect, the polyether oligomer backbone comprised in the polyether oligomer is obtained by copolymerization of tetrahydrofuran units, ethylene oxide units, and optionally propylene oxide units.

In an advantageous aspect, the polyether oligomer for use in the present disclosure comprises at least two free-radical (co)polymerizable reactive groups.

According to another advantageous aspect, the at least one free-radical (co)polymerizable reactive group of the polyether oligomer is selected from the group consisting of ethylenically unsaturated groups.

In a more advantageous aspect of the disclosure, the ethylenically unsaturated groups comprised in the polyether oligomer are selected from the group consisting of (meth) acrylic groups, vinyl groups, styryl groups, and any combinations or mixtures thereof. More preferably, the ethylenically unsaturated groups are selected from the group consisting of methacrylic groups, acrylic groups, and any combinations or mixtures thereof.

In a particularly preferred aspect of the disclosure, the ethylenically unsaturated groups comprised in the polyether oligomer are selected from the group of methacrylic groups.

Advantageously, the polyether oligomer for use herein is an ethylenically unsaturated compound.

According to one advantageous aspect of the curable precursor of the disclosure, the polyether oligomer for use herein has the following formula:

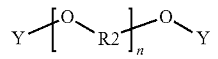

wherein:

Y is a free-radical (co)polymerizable reactive group, in particular an ethylenically unsaturated group;

each $R^2$ is independently selected from the group consisting of alkylene groups having in particular from 2 to 6 carbons;

and n is an integer selected such that the calculated number average molecular weight of the polyether oligomer is of at least 2000 g/mol.

According to another advantageous aspect of the present disclosure, the polyether oligomer for use herein has the following formula:

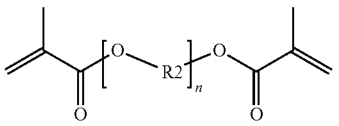

wherein:

each $R^2$ is independently selected from the group consisting of alkylene groups having from 2 to 6 carbon atoms; and n is an integer selected such that the calculated number average molecular weight of the polyether oligomer is in particular in a range from 2000 to 20.000 g/mol.

In one particular aspect, n is selected such that the calculated number average molecular weight is at least 2000 g/mol, at least 3000 g/mol, or even at least 4000 g/mol. In another particular aspect, n is selected such that the calculated number average molecular weight is no greater than 20.000 g/mol, no greater than 15.000 g/mol, or even no greater than 10.000 g/mol. In still another particular aspect, n is selected such that the calculated number average molecular weight is between 2000 and 20.000 g/mol, between 3000 and 15.000 g/mol, or even between 3000 and 10.000 g/mol, where all ranges are inclusive of the end points.

According to still another advantageous aspect of the present disclosure, the polyether oligomer for use herein has the following formula:

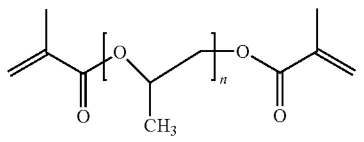

According to still another advantageous aspect of the present disclosure, the polyether oligomer for use herein has the following formula:

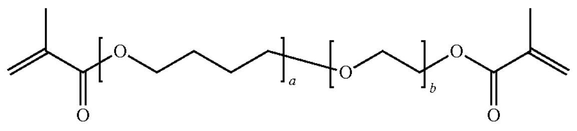

wherein a and b are integers greater than or equal to 1, the sum of a and b is equal to n, and wherein n is in particular selected such that the calculated number average molecular weight of the polyether oligomer is in a range from 2000 to 20.000 g/mol.

According to yet another advantageous aspect of the present disclosure, the linear polyether oligomer backbone of the polyether oligomer is obtained by copolymerization of tetrahydrofuran units and ethylene oxide units, wherein the mole ratio of these monomer units is in a range from 1:2.5 to 1:5, or even from 1:3 to 1:4.

In an exemplary aspect, the curable precursor of the present disclosure comprises from 1 to 15 wt. %, from 2 to 12 wt. %, from 3 to 10 wt. %, from 4 to 10 wt. %, or even from 5 to 10 wt. %, of the polyether oligomer, wherein the weight percentages are based on the total weight of the curable precursor.

In an advantageous aspect of the present disclosure, the polyether oligomer is (co)polymerizable with monomer units (i) and/or (ii) and/or (iii) of the (meth)acrylate-based (co)polymer base component.

The curable precursor of the present disclosure further comprises a thermally conductive particulate material.

Thermally conductive particulate material for use herein are not particularly limited. Any thermally conductive particulate material commonly known in the art may be used in the context of the present disclosure. Suitable thermally conductive particulate material for use herein may be easily identified by those skilled in the art in the light of the present disclosure.

In a typical aspect of the disclosure, the thermally conductive particulate material for use herein is selected from the group consisting of metal oxides, metal nitrides, metal hydroxides, metallic particles, coated metallic particles, ceramic particles, coated ceramic particles, and any combinations or mixtures thereof.

In an advantageous aspect, the thermally conductive particulate material for use in the disclosure is selected from the group consisting of aluminum oxide, aluminum hydroxide, boron nitride, aluminum nitride, silicon nitride, gallium nitride, silicon oxide, magnesium oxide, zinc oxide, zirconium oxide, tin oxide, copper oxide, chromium oxide, titanium oxide, silicon carbide, graphite, magnesium hydroxide, calcium hydroxide, carbon nanotubes, carbon black, carbon fibers, diamond, clay, aluminosilicate, calcium carbonate, barium titanate, potassium titanate, copper, silver, gold, nickel, aluminum, platinum, and any combinations or mixtures thereof.

According to a more advantageous aspect, the thermally conductive particulate material for use herein is selected from the group consisting of aluminum oxide, aluminum hydroxide, boron nitride, and any combinations or mixtures thereof.

According to a preferred aspect of the disclosure, the thermally conductive particulate material for use herein is selected from the group consisting of aluminum oxide, aluminum hydroxide, and any combinations or mixtures thereof.

In an advantageous aspect, the thermally conductive particulate material for use herein takes a physical form selected from the group of primary particles, primary particle agglomerates, and any combinations or mixtures thereof.

In another advantageous aspect, the thermally conductive primary particles and primary particle agglomerates for use herein have a shape selected from the group consisting of isotropic shapes, anisotropic shapes, and any combinations or mixtures thereof.

In still another advantageous aspect, the thermally conductive primary particles and primary particle agglomerates for use herein have a shape selected from the group consisting of spherical, platelet, and any combinations or mixtures thereof.

According to a yet another advantageous aspect, the thermally conductive particulate material for use herein comprises a mixture of thermally conductive primary particles and primary particle agglomerates having dissimilar shapes and sizes.

Exemplary thermally conductive primary particles and primary particle agglomerates for use herein are described e.g. in EP-A1-3 127 973 (Wieneke et al.).

Through-plane thermal conductivity may become most critical in some applications, such as e.g. thermally-conductive filler applications. Therefore, in some aspects, generally symmetrical and isotropic thermally conductive particles (e.g., spherical particles) may be preferred, as asymmetrical fibers, flakes, or plates may tend to align in the in-plane direction;

According to a particularly advantageous aspect of the curable precursor of the disclosure, the thermally conductive particulate material comprises thermally conductive particles provided with a surface functionalization. Surface functionalization for use herein are not particularly limited. Any surface functionalization commonly known in the art and used in combination with the thermally conductive particulate material may be used in the context of the present disclosure. Suitable thermally conductive particles provided with a surface functionalization for use herein may be easily identified by those skilled in the art in the light of the present disclosure.

In one exemplary aspect of the disclosure, the surface functionalization of the thermally conductive particulate material has a polarity selected from the group consisting of acidic-functional, basic-functional, hydrophobic, hydrophilic, and any combinations or mixtures thereof.

In one advantageous aspect of the disclosure, the surface functionalization of the thermally conductive particulate material comprises hydrophobic surface functionalization.

In the context of the present disclosure, the expression "hydrophobic surface functionalization" is meant to express that the surface of the thermally conductive particulate material, after suitable surface modification, has little or no affinity for polar substances, in particular water. The expression "hydrophilic surface functionalization" is meant to express that the surface of the thermally conductive particulate material, after suitable surface modification, has relatively high affinity for polar substances, in particular water.

According to one advantageous aspect of the disclosure, the surface functionalization of the thermally conductive particles has the same polarity as the functional group of the optionally ethylenically unsaturated monomer units which are copolymerizable with monomer units (i) and/or (ii) of the (meth)acrylate-based (co)polymer base component.

According to another advantageous aspect of the disclosure, the surface functionalization of the thermally conductive particles has a polarity opposite to the functional group of the optionally ethylenically unsaturated monomer units which are copolymerizable with monomer units (i) and/or (ii) of the (meth)acrylate-based (co)polymer base component.

In the context of the present disclosure, it has been surprisingly found that thermally conductive particulate material provided with a surface functionalization provides advantageous surface interactions with, in particular, the optional ethylenically unsaturated monomer units having a functional group, which in turn contribute to provide advantageous rheological profile to the curable precursor of the present disclosure. Without wishing to be bound by theory, it is further believed that thermally conductive particulate material provided with a surface functionalization may additional provide advantageous surface interactions with the crosslinker and/or the polyether oligomer. It is further believed that the surface functionalization, in particular hydrophobic surface functionalization, provides improved dispersion of the thermally conductive particulate material into the of the (meth)acrylate-based (co)polymer base component.

In an advantageous aspect, the thermally conductive particulate material for use herein are further provided with any of flame-retardancy properties, electrical insulation properties, and any combinations thereof.

According to a typical aspect, the curable precursor of the disclosure comprises from 40 to 95 wt. %, from 50 to 95 wt. %, from 50 to 90 wt. %, from 60 to 90 wt. %, from 60 to 85 wt. %, or even from 70 to 85 wt. %, of the thermally conductive particulate material, wherein the weight percentages are based on the total weight of the curable precursor.

According to another typical aspect of the disclosure, the curable precursor comprises at least 30% by volume, at least 50% by volume, at least 65% by volume, or even at least 70% by volume, of the thermally conductive particulate material, wherein the volume percentages based on the total volume of the curable precursor.

According to still another typical aspect of the disclosure, the curable precursor comprises from 30 to 75% by volume, from 40 to 70% by volume, from 50 to 70% by volume, or even from 60 to 70% by volume, of the thermally conductive particulate material, wherein the volume percentages based on the total volume of the curable precursor.

According to yet another typical aspect of the disclosure, the curable precursor further comprises a free-radical polymerization initiator. Exemplary free-radical polymerization initiators for use herein include, but are not limited to, organic peroxides, in particular hydroperoxides, ketone peroxides, and di acyl peroxides.

According to a particular aspect, the curable precursor of the disclosure comprises:

a) from 1 to 15 wt. %, from 2 to 12 wt. %, from 3 to 10 wt. %, from 4 to 10 wt. %, or even from 5 to 10 wt. %, of the (meth)acrylate-based (co)polymer base component, a (meth)acrylate-based (co)polymer base component;

b) from 0.01 to 10 wt. %, from 0.01 to 8 wt. %, from 0.05 to 6 wt. %, from 0.05 to 5 wt. %, from 0.05 to 4 wt. %, from 0.1 to 2 wt. %, or even from 0.1 to 1 wt. %, of the crosslinker for the (meth)acrylate-based (co)polymer base component;

c) from 1 to 15 wt. %, from 2 to 12 wt. %, from 3 to 10 wt. %, from 4 to 10 wt. %, or even from 5 to 10 wt. %, of the polyether oligomer;

d) from 40 to 95 wt. %, from 50 to 95 wt. %, from 50 to 90 wt. %, from 60 to 90 wt. %, from 60 to 85 wt. %, or even from 70 to 85 wt. %, of the thermally conductive particulate material; and e) a free-radical polymerization initiator;

wherein the weight percentages are based on the total weight of the curable precursor.

According to one advantageous aspect of the disclosure, the curable precursor is (substantially) free of any of plasticizer(s), thixotropic agent(s), silicon-based compounds, halogen-based compounds, isocyanate-based compounds, and any combinations or mixtures thereof.

According to another advantageous aspect of the disclosure, the curable precursor is (substantially) free of solvent(s), in particular organic solvent(s).

In one typical execution, the curable precursor of the present disclosure is in the form of a two-part composition having a first part and a second part, wherein the first part and the second part are kept separated prior to combining the two parts and forming the cured composition.

In an advantageous aspect of the disclosure, the two parts of the curable precursor may be conveniently mixed with a mixing ratio in a range from 1:5 to 5:1, from 1:3 to 3:1, from 1:2 to 2:1, or even from 1:1.5 to 1.5:1.

In a particularly advantageous aspect of the disclosure, the two parts of the curable precursor may be conveniently mixed with a mixing ratio of about 1:1.

According to an alternative aspect, the curable precursor of the present disclosure is in the form of a one-part adhesive composition.

According to an advantageous aspect, the curable precursor of the disclosure is curable at 23° C. at a curing percentage greater than 90%, greater than 95%, greater than 98%, or even greater than 99%, after a curing time no greater than 72 hours, no greater than 48 hours, or even no greater than 24 hours.

The curing time may be adjusted as desired depending on the targeted applications and manufacturing requirements.

According to another advantageous aspect, the curable precursor is curable without using any actinic radiation, in particular UV light.

According to still another advantageous aspect, the curable precursor is curable without using any additional thermal energy.

In a preferred aspect of the disclosure, the curable precursor is a thermally-conductive gap filler composition.

In the context of the present disclosure, it has been indeed surprisingly discovered that the curable precursor adhesive composition of the present disclosure is outstandingly suitable for thermal management applications, in particular for the manufacturing of a thermally-conductive gap filler composition which may advantageously be used in the manufacturing of battery modules for use in the automotive industry. This is in particular due to the outstanding characteristics and performance as to adhesion, thermal conductivity and mechanical properties (in particular structural strength, flexibility and elasticity) in its fully cured state, and the outstanding characteristics relating to workability and processability (such as e.g. mixing properties, pumpability, flowability, extrudability, applicability, coatability) provided by the curable precursor in its uncured state.

The thermally-conductive gap filler compositions based on the curable composition according to the disclosure are particularly suitable for use in batteries and battery assemblies, specifically the types of batteries used in electric and hybrid electric automobiles. The usefulness of the curable compositions, however, is not so limited. The thermally-conductive gap filler compositions described herein may find use wherever such materials are used, for instance, in electronics (e.g., consumer electronics) applications.

Thermal management plays an important role in many electronics applications. For example, challenges for integrating lithium-ion batteries into electric vehicle battery packs include performance, reliability and safety. Proper thermal management of battery assemblies contributes to addressing each of these challenges. This includes both first level thermal management where battery cells are assembled in a battery module, and second level thermal management where these modules are assembled into battery subunits or battery systems. Thermal management can also be important in the cooling of battery control units, as well as non-battery electronic applications.

Currently, thermal management for battery assemblies relies on curable-liquid gap fillers or pads. The curable liquids flow during assembly and can adjust to dimensional variations before being cured. Also, the liquids can be applied at the time of assembly allowing greater design flexibility. However, the current uncured and cured compositions have several limitations including the presence of contaminants, as discussed below. Pads comprise a predetermined lay-out of cured material; thus, pads have a reduced tendency to introduce contaminants. However, the cured materials may not provide acceptable conformability to accommodate the range of dimensional variations seen in typical battery assemblies. Also, design changes can be costlier and more complex, as new design lay-outs must be generated.

Liquid thermal gap fillers are typically based on silicones or polyurethanes. Although silicones offer good elastomer properties for this application, they often contain non-functional polymer and volatile residuals from their production processes. Electrical contacts of the battery cell can become contaminated by silicone oil migration. Residuals of volatiles can lead to shrinkage over time. Also, even minute amounts of non-functional polymer can lead to detrimental contamination on metal surfaces inhibiting adhesion of paints or adhesives.

In the context of the present disclosure, it has been unexpectedly found that thermally-conductive gap filler compositions based on the curable precursor of an adhesive composition according to the disclosure may substantially overcome the above-mentioned deficiencies.

In some aspects, thermally-conductive gap filler compositions based on the curable composition according to the disclosure may provide one or more of the following advantageous benefits: (i) easily adjustable cure profile to allow adaption to specific working cycles; (ii) advantageous rheological behavior of the uncured composition; (iii) sufficient open time before cure to allow components to be applied and positioned; (iv) rapid cure after the open time; (v) curing without additional energy input, in particular thermal energy or actinic radiation; (vi) compositions curable without the need for expensive catalysts such as platinum; (vii) advantageous wetting behavior on parts; (viii) stability of the cured composition; (ix) advantageous softness and spring back (recovery on deformation) properties to ensure good contact under use conditions; (x) absence of air inclusions and gas or bubble formation to minimize reduction in thermal conductivity; (xi) absence of contaminants, such as e.g. unreacted components and low molecular weight materials, or volatile components; and (xii) good bonding between sequentially cured layers of the same material.

According to an advantageous aspect, the curable precursor according to the disclosure has a thermal conductivity of at least 0.1 W/mK, at least 0.2 W/mK, at least 0.5 W/mK, at least 0.7 W/mK, at least 1.0 W/mK, at least 1.2 W/mK, at least 1.5 W/mK, at least 1.7 W/mK, or even at least 2.0 W/mK, when measured according to the test method described in the experimental section.

According to another advantageous aspect, the curable precursor has a thermal conductivity in a range from 0.1 to 5.0 W/mK, from 0.2 to 5.0 W/mK, from 0.2 to 4.0 W/mK, from 0.5 to 4.0 W/mK, from 0.5 to 3.0 W/mK, or even from 1.0 to 2.5 W/mK, when measured according to the test method described in the experimental section.

In one beneficial aspect, the curable precursor has an overlap shear strength (OLS) of at least 2.0 MPa, at least 2.5 MPa, at least 3.0 MPa, at least 3.5 MPa, at least 4.0 MPa, at least 4.5 MPa, at least 5.0 MPa, or even at least 5.5 MPa, when measured according to the test method described in the experimental section.

In another beneficial aspect, the curable precursor has an overlap shear strength (OLS) in a range from 2.0 to 8.0 MPa, from 2.5 to 8.0 MPa, from 2.5 to 7.0 MPa, from 3.0 to 7.0 MPa, from 3.5 to 6.5 MPa, or even from 4.0 to 6.0 MPa, when measured according to the test method described in the experimental section.

In still another beneficial aspect, the curable precursor has a tensile strength of at least 3.0 MPa, at least 3.5 MPa, at least 4.0 MPa, at least 4.5 MPa, at least 5.0 MPa, at least 5.5 MPa, at least 6.0 MPa, or even at least 6.5 MPa, when measured according to the test method described in the experimental section.

According to yet another beneficial aspect, the curable precursor of the present disclosure has a tensile strength in a range from 2.0 to 10.0 MPa, from 2.5 to 8.0 MPa, from 3.0 to 8.0 MPa, from 3.5 to 8.0 MPa, from 3.5 to 7.5 MPa, or even from 4.0 to 7.0 MPa, when measured according to the test method described in the experimental section.

According to another advantageous aspect, the curable precursor has an elongation at break of at least 5%, at least 8%, at least 10%, at least 12%, at least 15%, or even at least 18%, when measured according to the test method described in the experimental section.

According to still another advantageous aspect, the curable precursor has a complex viscosity no greater than 50 Pa·s, no greater than 45 Pa·s, no greater than 40 Pa·s, no greater than 35 Pa·s, or even no greater than 30 Pa·s, when measured according to test method DIN 54458 at test sequence T4 and under analysis point A4.

According to still another advantageous aspect, the curable precursor has a complex viscosity in a range from 5 to 50 Pa·s, from 5 to 45 Pa·s, from 10 to 45 Pa·s, from 15 to 45 Pa·s, from 15 to 40 Pa·s, from 20 to 40 Pa·s, from 25 to 40

Pa·s, or even from 25 to 35 Pa·s, when measured according to test method DIN 54458 at test sequence T4 and under analysis point A4.

According to still another advantageous aspect, the curable precursor has a dosing speed of at least 2.0 ml/s, at least 2.5 ml/s, at least 3.0 ml/s, at least 3.5 ml/s, at least 4.0 ml/s, at least 4.5 ml/s, at least 5.0 ml/s, at least 5.5 ml/s, at least 6.0 ml/s, or even at least at least 6.5 ml/s, when measured according to the test method described in the experimental section.

In another aspect of the present disclosure, it is provided a curing system suitable for a curable precursor of an adhesive composition comprising a polyether oligomer having a number average molecular weight of at least 2000 g/mol and which comprises at least one free-radical (co) polymerizable reactive group, wherein the curing system comprises a crosslinker comprising at least one acid-functional group derived from phosphoric acid and at least one free-radical (co)polymerizable reactive group.

All the particular and preferred aspects relating to, in particular, the (meth)acrylate-based (co)polymer base component, the crosslinker and the polyether oligomer which were described hereinabove in the context of the curable precursor, are fully applicable to the curing system as described above.

According to another aspect, the present disclosure is directed to a battery module comprising a plurality of battery cells connected to a first base plate by a first layer of a first curable precursor as described above.

According to still another aspect, the present disclosure relates to a battery subunit comprising a plurality of battery modules connected to a second base plate by a second layer of a second curable precursor, wherein each battery module comprises a plurality of battery cells connected to a first base plate by a first layer of a curable precursor, wherein the first curable composition and the second curable precursor are independently selected, and wherein each is a curable precursor as described above.

In an advantageous aspect, each of the first and second curable precursor comprised in the battery module or battery subunit as, described above, is a thermally-conductive gap filler composition.

All the particular and preferred aspects relating to, in particular, the (meth)acrylate-based (co)polymer base component, the crosslinker and the polyether oligomer which were described hereinabove in the context of the curable precursor, are fully applicable to the battery module and battery subunit as described above.

Figure 2:
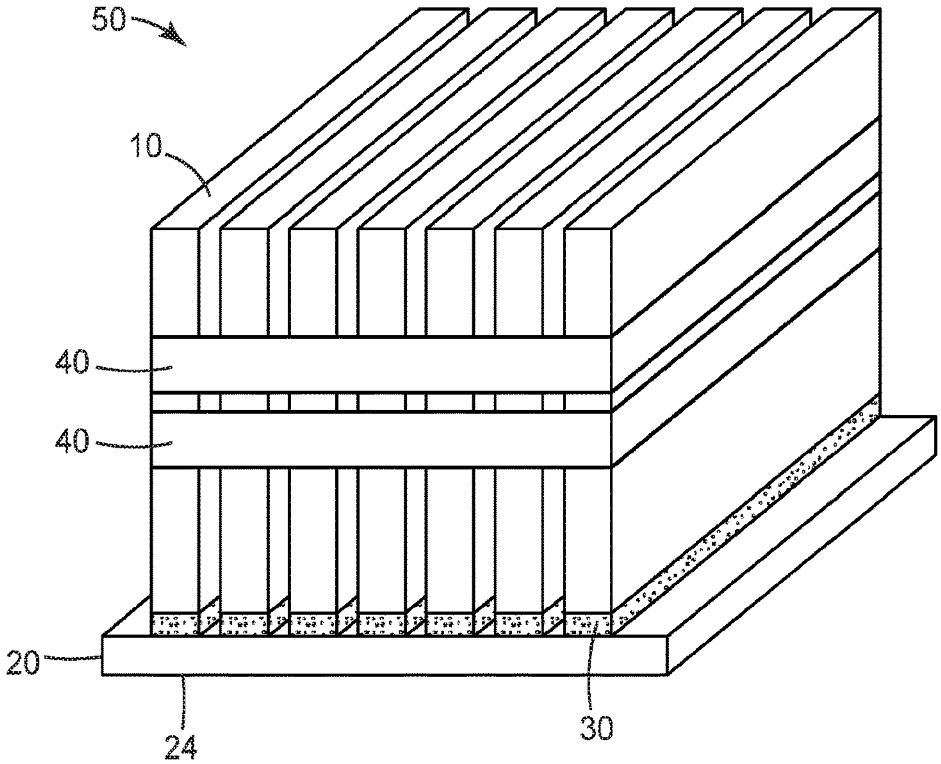
FIG. 2 illustrates the assembled battery module corresponding to FIG. 1.

Components of a representative battery module during assembly are shown in FIG. 1, and the assembled battery module is shown in FIG. 2. Battery module 50 is formed by positioning a plurality of battery cells 10 on first base plate 20. Generally, any known battery cell may be used including, e.g., hard case prismatic cells or pouch cells. The number, dimensions, and positions of the cells associated with a battery module may be adjusted to meet specific design and performance requirements. The constructions and designs of the base plate are well-known, and any base plate (typically metal base plates) suitable for the intended application may be used.

Battery cells 10 are connected to first base plate 20 through first layer 30 of a first curable precursor (in particular a thermally conductive gap filler composition) according to the present disclosure.

First layer 30 of the first thermally conductive gap filler provides first level thermal management where the battery cells are assembled in a battery module. As a voltage difference (e.g., a voltage difference of up to 2.3 Volts) is possible between the battery cells and the first base plate, breakthrough voltage may be an important safety feature for this layer. Therefore, in one particular aspect, electrically insulating fillers like ceramics (typically alumina and boron nitride) may be preferred for use in the first thermally conductive gap filler.

In one particular aspect, layer 30 may comprise a discrete pattern of the first thermally conductive gap filler applied to first surface 22 of first base plate 20, as shown in FIG. 1. For example, a pattern of gap filler corresponding to the desired lay-out of the battery cells may be applied, e.g., robotically applied, to the surface of the base plate. The first layer may be formed as a coating of the first thermally conductive gap filler covering all, or substantially all, of the first surface of the first base plate. Alternatively, the first layer may be formed by applying the first thermally conductive gap filler directly to the battery cells and then mounting them to the first surface of the first base plate.

During the assembly step illustrated in FIG. 1, the first thermally conductive gap filler is not yet fully cured. This allows the individual battery cells to be positioned and repositioned as needed to achieve the desired layout. The rheological behavior of the not-fully-cured thermally conductive gap filler aides in allowing the gap filler to flow and accommodate the dimensional variations (tolerances) within and between individual battery cells.

In one particular aspect, the gap filler may need to accommodate dimensional variations of up to 2 mm, up to 4 mm, or even more. Therefore, in one particular aspect, the first layer of the first thermally conductive gap filler is at least 0.05 mm thick, e.g., at least 0.1 mm, or even at least 0.5 mm thick. Higher breakthrough voltages may require thicker layers depending on the electrical properties of the gap filler, e.g., in one particular aspect, at least 1, at least 2, or even at least 3 mm thick. Generally, to maximize heat conduction through the gap filler and to minimize cost, the gap filler layer should be as thin as possible, while still ensuring good (thermal) contact with first base plate 20. Therefore, in one particular aspect, the first layer is no greater than 5 mm thick, e.g., no greater than 4 mm thick, or even no greater than 2 mm thick.

In one particular aspect, the thermally-conductive gap filler exhibits shear thinning behavior in its uncured state. This can assist in the uniform application of the gap filler by, e.g., spray, jet, or roll coating. This rheological behavior may aide in allowing the gap filler to be applied using conventional robotic techniques. Shear thinning may also aide in easing the positioning of the individual battery cells by allowing easier movement while still holding the cells in place before final cure is achieved.

As the thermally-conductive gap filler cures, the battery cells are held more firmly in-place. Further, when curing is complete, the battery cells are finally fixed in their desired position, as illustrated in FIG. 2. Accordingly, to better automate the manufacturing process, it is important to be able to also predict and control the so-called curing time.

Additional elements, such as bands 40 may be used to secure the cells for transport and further handling. Generally, it is desirable for the control cure thermally-conductive gap filler to cure at typical application conditions, e.g., without the need for elevated temperatures or actinic radiation (e.g., ultraviolet light). In one particular aspect, the first thermally conductive gap filler cures at no greater than 30° C., e.g., no greater than 25° C., or even no greater than 20° C.

Figure 3:
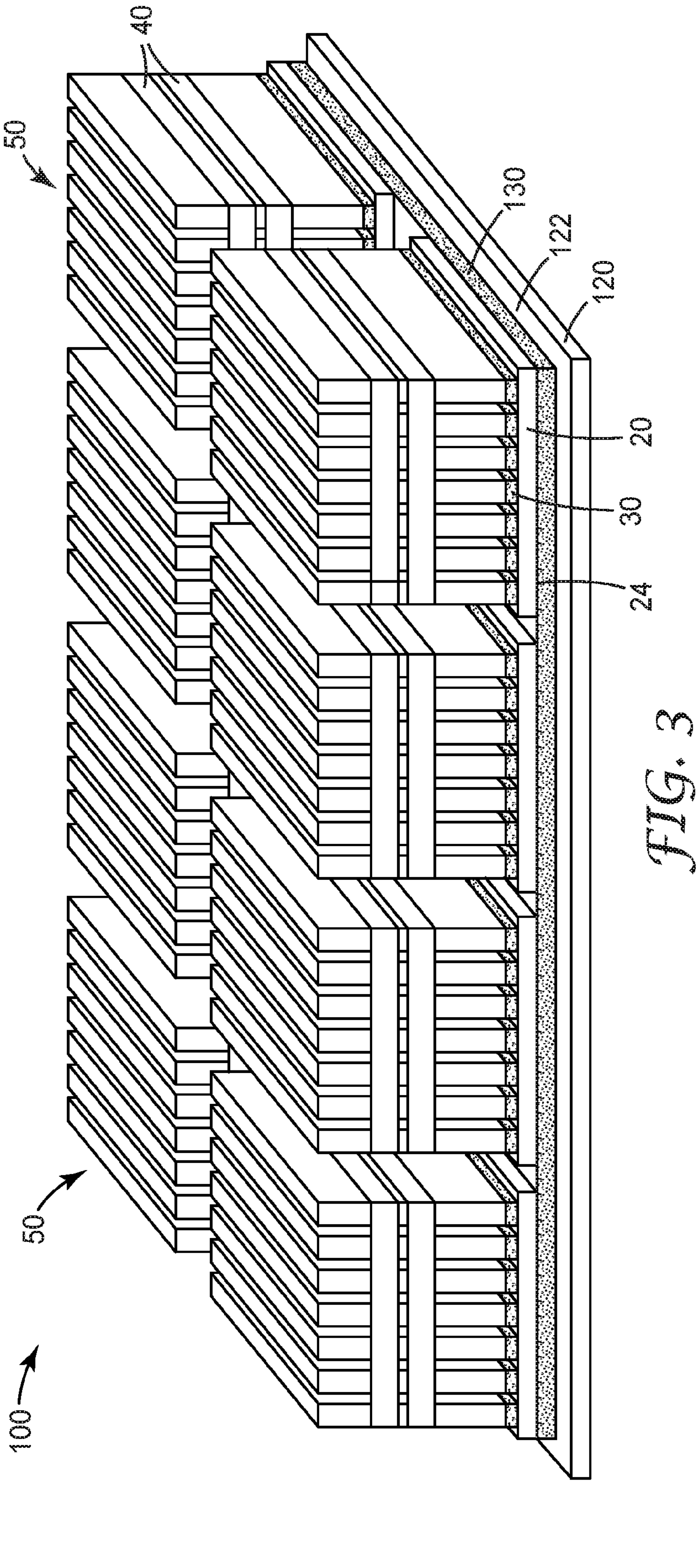
FIG. 3 illustrates the assembly of an exemplary battery subunit according to one aspect of the present disclosure.

As shown in FIG. 3, a plurality of battery modules 50, such as those illustrated and described with respect to FIGS.

1 and 2, are assembled to form battery subunit 100. The number, dimensions, and positions of the modules associated with a particular battery subunit may be adjusted to meet specific design and performance requirements. The constructions and designs of the second base plate are well-known, and any base plate (typically metal base plates) suitable for the intended application may be used.

Individual battery modules 50 are positioned on and connected to second base plate 120 through second layer 130 of a second thermally conductive gap filler, which may be a control cure thermally-conductive gap filler containing the curing agent described herein.

The second layer 130 of a second thermally conductive gap filler is positioned between second surface 24 of first base plate 20 (see FIGS. 1 and 2) and first surface 122 of second base plate 120. The second thermally conductive gap filler provides second level thermal management where the battery modules are assembled into battery subunits. The second thermally conductive gap filler may be a control cure thermally-conductive gap filler. Further, at this level, breakthrough voltage may not be a requirement. Therefore, in one particular aspect, electrically conductive fillers such as graphite and metallic fillers may be used, alone or in combination with electrically insulating fillers like ceramics.

The second layer 130 may be formed as a coating of the second thermally conductive gap filler covering all or substantially all of first surface 122 of second base plate 120, as shown in FIG. 3. Alternatively, the second layer may comprise a discrete pattern of the second thermally conductive gap filler applied to the surface of the second base plate. For example, a pattern of gap filler corresponding to the desired lay-out of the battery modules may be applied, e.g., robotically applied, to the surface of the second base plate. In an alternative aspect, the second layer may be formed by applying the second thermally conductive gap filler directly to second surface 24 of first base plate 20 (see FIGS. 1 and 2) and then mounting the modules to first surface 122 of second base plate 120.

During the assembly step, the second thermally conductive gap filler is not yet fully cured. This allows the individual battery modules to be positioned and repositioned as needed to achieve the desired layout. As the second thermally conductive gap filler continues to cure, the battery modules are held more firmly in-place, until they are finally fixed in their desired position. Thus, it is important to be able to predict and control the so-called pot life and cure times of the gap filler.

The second thermally conductive gap filler may exhibit shear thinning behavior in its uncured (or not fully cured) state. This can assist in the uniform application of the gap filler to the surface of the second base plate by, e.g., spray, jet, or roll coating. This rheological behavior may aide in allowing the gap filler to be applied the surface of the second base plate using conventional robotic techniques or may aide in easing the positioning of the individual battery modules by allowing easier movement while still holding the modules in place before final cure is achieved.

Starting with a liquid, not-fully-cured thermally conductive gap filler also aides in allowing the gap filler to flow and accommodate varying dimensional variations (tolerances) within and between individual battery modules. Therefore, in one particular aspect, the layer of second thermally conductive gap filler is at least 0.05 mm thick, e.g., at least 0.1, or even at least 0.5 mm thick. In one particular aspect, thicker layers may be required to provide the required mechanical strength, e.g., in some particular aspects, at least 1, at least 2, or even at least 3 mm thick. Generally, to maximize heat conduction through the gap filler and to minimize cost, the second layer should be as thin as possible, while still ensure good contact. Therefore, in one particular aspect, the second layer is no greater than 5 mm thick, e.g., no greater than 4 mm thick, or even no greater than 2 mm thick.

The assembled battery subunits may be combined to form further structures. For example, as is known, battery modules may be combined with other elements such as battery control units to form a battery system, e.g., battery systems used in electric vehicles. Additional layers of thermally conductive gap filler according to the present disclosure may be used in the assembly of such battery systems. For example, thermally conductive gap filler according to the present disclosure may be used to mount and help cool the battery control unit.

According to another aspect, the present disclosure is directed to a method of manufacturing a curable precursor of an adhesive composition, comprising the steps of:

a) providing a (meth)acrylate-based (co)polymer base component comprising the free-radical (co)polymerization reaction product of a (co)polymerizable material comprising $C_1$-$C_{32}$ (meth)acrylic acid ester monomer units;
b) providing a polyether oligomer having a number average molecular weight of at least 2000 g/mol and which comprises at least one free-radical (co)polymerizable reactive group;
c) providing a crosslinker for the (meth)acrylate-based (co)polymer base component, which comprises at least one acid-functional group derived from phosphoric acid and at least one free-radical (co)polymerizable reactive group; and
d) combining the base component, the polyether oligomer and the crosslinker.

All the particular and preferred aspects relating to, in particular, the (meth)acrylate-based (co)polymer base component, the crosslinker and the polyether oligomer which were described hereinabove in the context of the curable precursor, are fully applicable to the method as described above.

Reproducing the method of manufacturing a curable precursor as described above is well within the capabilities of those skilled in the art reading the present disclosure.

In yet another aspect of the present disclosure, it is provided a method of manufacturing a battery module, which comprises the steps of:

a) applying a first layer of a first curable precursor as described above to a first surface of a first base plate;
b) attaching a plurality of battery cells to the first layer to connect the battery cells to the first base plate; and
c) curing the first curable precursor or allowing the first curable precursor to cure.

In yet another aspect, the present disclosure relates to a method of manufacturing a battery subunit, which comprises the steps of:

a) applying a second layer of a second curable precursor as described above to a first surface of a second base plate;
b) attaching a plurality of battery modules to the second layer to connect the battery modules to the second base plate; and
c) curing the second curable precursor or allowing the second curable precursor to cure.

According to still another aspect, the present disclosure relates to the use of curable precursor or a cured composition as described above, for industrial applications, in particular for automotive applications, more in particular for thermal management applications in the automotive industry.

According to yet another aspect, the present disclosure relates to the use of curable precursor or a cured composition as described above, for the manufacturing of a thermally-conductive gap filler composition.

In yet another aspect, the present disclosure relates to the use of a curable precursor or a cured composition as described above, for the manufacturing of a battery module comprising a plurality of battery cells, in particular for use in the automotive industry.

In yet another aspect, the present disclosure relates to the use of a curing system as described above for the manufacturing of a curable composition, in particular comprising a polyether oligomer having a number average molecular weight of at least 2000 g/mol and which comprises at least one free-radical (co)polymerizable reactive group.

In yet another aspect, the present disclosure relates to the use of a curing system as described above for thermal management applications, in particular in the automotive industry.

According to still another aspect, the present disclosure is directed to the use of a curing system as described above for the manufacturing of a thermally-conductive gap filler composition.

According to still another aspect, the present disclosure is directed to the use of a curing system as described above for the manufacturing of a battery module comprising a plurality of battery cells, in particular for use in the automotive industry.

According to still another aspect, the present disclosure is directed to the use as described above, in combination with a polyether oligomer having a number average molecular weight of at least 2000 g/mol and which comprises at least one free-radical (co)polymerizable reactive group.

Item 1 is a (free-radical) curable precursor of a (semi-structural) adhesive composition, comprising:

a) a (meth)acrylate-based (co)polymer base component comprising the free-radical (co)polymerization reaction product of a (co)polymerizable material comprising:
   i. (low Tg) $C_1$-$C_{32}$ (meth)acrylic acid ester monomer units;
   ii. optionally, (low Tg) $C_1$-$C_{18}$ methacrylic acid ester monomer units; and
   iii. optionally, (high Tg) ethylenically unsaturated monomer units having a functional group and which are copolymerizable with monomer units (i) and/or (ii);
b) a crosslinker for the (meth)acrylate-based (co)polymer base component, which comprises at least one acid-functional group derived from phosphoric acid and at least one free-radical (co)polymerizable reactive group;
c) a polyether oligomer having a number average molecular weight of at least 2000 g/mol and which comprises at least one free-radical (co)polymerizable reactive group; and
d) a thermally conductive particulate material.

Item 2 is a curable precursor according to item 1, wherein the (low Tg) $C_1$-$C_{32}$ (meth)acrylic acid ester monomer units are selected from the group consisting of linear or branched $C_1$-$C_{32}$ (meth)acrylic acid ester monomer units, $C_1$-$C_{24}$ (meth)acrylic acid ester monomer units, or even $C_1$-$C_{18}$ (meth)acrylic acid ester monomer units.

Item 3 is a curable precursor according to any of item 1 or 2, wherein the (low Tg) $C_1$-$C_{32}$ (meth)acrylic acid ester monomer units are selected from the group consisting of iso-octyl (meth)acrylate, 2-ethylhexyl (meth)acrylate, 2-propylheptyl (meth)acrylate, butyl (meth)acrylate, and any mixtures thereof.

Item 4 is a curable precursor according to any of the preceding items, wherein the (low Tg) $C_1$-$C_{32}$ (meth)acrylic acid ester monomer units are selected from the group consisting of 2-ethylhexyl (meth)acrylate, n-butyl (meth) acrylate, and any mixtures thereof.

Item 5 is a curable precursor according to any of the preceding items, wherein the (low Tg) $C_1$-$C_{32}$ (meth)acrylic acid ester monomer units have no functional groups.

Item 6 is a curable precursor according to any of the preceding items, wherein the (low Tg) $C_1$-$C_{32}$ (meth)acrylic acid ester monomer units are different from the optional (low Tg) $C_1$-$C_{18}$ methacrylic acid ester monomer units and different from the optional (high Tg) ethylenically unsaturated monomer units having a functional group and which are copolymerizable with monomer units (i) and/or (ii).

Item 7 is a curable precursor according to any of the preceding items, wherein the (meth)acrylate-based (co)polymer base component comprises the (free-radical random) copolymerization reaction product of a copolymerizable material comprising from 45 to 99 wt. %, from 50 to 99 wt. %, from 60 to 99 wt. %, from 70 to 98 wt. %, from 80 to 98 wt. %, from 85 to 98 wt. %, or even from 90 to 98 wt. % of the (low Tg) $C_1$-$C_{32}$ (meth)acrylic acid ester monomer units, wherein the weight percentages are based on the total weight of the (meth)acrylate-based (co)polymer base component.

Item 8 is a curable precursor according to any of the preceding items, wherein the (high Tg) $C_1$-$C_{18}$ methacrylic acid ester monomer units are selected from the group consisting of methyl methacrylate, ethyl methacrylate, propyl methacrylate, n-butyl methacrylate, t-butyl methacrylate, isobutyl methacrylate, n-hexyl methacrylate, tetrahydrofurfuryl methacrylate, cyclohexyl methacrylate, 3,3,5-trimethylcyclohexyl methacrylate, tert-butyl cyclohexyl methacrylate, heptyl methacrylate, cycloheptyl methacrylate, 2-ethyhexyl methacrylate, n-octyl methacrylate, 2-phenoxy ethyl methacrylate, nonyl methacrylate, decyl methacrylate, lauryl methacrylate, isobornyl methacrylate, phenyl methacrylate, benzyl methacrylate, and any mixtures thereof.

Item 9 is a curable precursor according to any of the preceding items, wherein the (high Tg) $C_1$-$C_{18}$ methacrylic acid ester monomer units are selected from the group consisting of 2-ethyhexyl methacrylate, isodecyl methacrylate, isotridecanol methacrylate, methacrylic ester 17.4, ethyltriglycol methacrylate, 2-dimethyl aminoethyl methacrylate, and any mixtures thereof.

Item 10 is a curable precursor according to any of the preceding items, wherein the (high Tg) $C_1$-$C_{18}$ methacrylic acid ester monomer units are selected to comprise 2-ethyhexyl methacrylate.

Item 11 is a curable precursor according to any of the preceding items, wherein the (meth)acrylate-based (co)polymer base component comprises the (free-radical random) copolymerization reaction product of a copolymerizable material comprising from 1 to 15 wt. %, from 2 to 12 wt. %, from 3 to 10 wt. %, from 4 to 10 wt. %, or even from 5 to 10 wt. %, of the (low Tg) $C_1$-$C_{18}$ methacrylic acid ester monomer units, wherein the weight percentages are based on the total weight of the (meth)acrylate-based (co)polymer base component.

Item 12 is a curable precursor according to any of the preceding items, wherein the (low Tg) $C_1$-$C_{18}$ methacrylic acid ester monomer units have no functional groups.

Item 13 is a curable precursor according to any of the preceding items, wherein the (high Tg) ethylenically unsaturated monomer units having a functional group have a functional group selected from the group consisting of acid, amine, hydroxyl, amide, isocyanate, acid anhydride, epoxide, nitrile, and any combinations thereof.

Item 14 is a curable precursor according to any of the preceding items, wherein the (high Tg) ethylenically unsaturated monomer units having a functional group have a functional group selected from the groups of acid groups, in particular carboxylic acids.

Item 15 is a curable precursor according to any of the preceding items, wherein the (high Tg) ethylenically unsaturated monomer units having a functional group are selected from the group consisting of (meth)acrylic acid, methoxyethyl (meth)acrylate, ethoxyethyl (meth)acrylate, 2-hydroxyethyl (meth)acrylate, 2-aminoethyl (meth)acrylate, dimethylaminoethyl (meth)acrylate, diethylaminoethyl (meth)acrylate, N-vinyl pyrrolidone, N-vinyl caprolactam, (meth)acrylamide, N-vinylacetamide, maleic anhydride, 4-acryloyl morpholine, glycidyl (meth)acrylate, 2-isocyanato ethyl (meth)acrylate, tert-butylamino ethyl (meth)acrylate, acrylonitrile, and any mixtures thereof.

Item 16 is a curable precursor according to any of the preceding items, wherein the (high Tg) ethylenically unsaturated monomer units having a functional group are selected to comprise acrylic acid.

Item 17 is a curable precursor according to any of the preceding items, wherein the (meth)acrylate-based (co)polymer base component comprises the (free-radical random) copolymerization reaction product of a copolymerizable material comprising from 1 to 15 wt. %, from 2 to 12 wt. %, from 3 to 10 wt. %, from 4 to 10 wt. %, or even from 5 to 10 wt. %, of the (high Tg) ethylenically unsaturated monomer units having a functional group, wherein the weight percentages are based on the total weight of the (meth) acrylate-based (co)polymer base component.

Item 18 is a curable precursor according to any of the preceding items, wherein the (low Tg) $C_1$-$C_{32}$ (meth)acrylic acid ester monomer units, the (low Tg) $C_1$-$C_{18}$ methacrylic acid ester monomer units and the (high Tg) ethylenically unsaturated monomer units having a functional group are mutually self-excluding.

Item 19 is a curable precursor according to any of the preceding items, wherein the (meth)acrylate-based (co)polymer base component comprises the (free-radical random) copolymerization reaction product of a copolymerizable material comprising:

i. from 45 to 99 wt. %, from 50 to 99 wt. %, from 60 to 99 wt. %, from 70 to 98 wt. %, from 80 to 98 wt. %, from 85 to 98 wt. %, or even from 90 to 98 wt. % of the (low Tg) $C_1$-$C_{32}$ (meth)acrylic acid ester monomer units;

ii. optionally, from 1 to 15 wt. %, from 2 to 12 wt. %, from 3 to 10 wt. %, from 4 to 10 wt. %, or even from 5 to 10 wt. %, of the (low Tg) $C_1$-$C_{18}$ methacrylic acid ester monomer units; and iii. optionally, from 1 to 15 wt. %, from 2 to 12 wt. %, from 3 to 10 wt. %, from 4 to 10 wt. %, or even from 5 to 10 wt. %, of the (high Tg) ethylenically unsaturated monomer units having a functional group;

wherein the weight percentages are based on the total weight of the (meth)acrylate-based (co)polymer base component.

Item 20 is a curable precursor according to any of the preceding items, which comprises from 1 to 15 wt. %, from 2 to 12 wt. %, from 3 to 10 wt. %, from 4 to 10 wt. %, or even from 5 to 10 wt. %, of the (meth)acrylate-based (co)polymer base component, wherein the weight percentages are based on the total weight of the curable precursor.

Item 21 is a curable precursor according to any of the preceding items, wherein the crosslinker for the (meth) acrylate-based (co)polymer base component comprises at least two acid-functional groups derived from phosphoric acid.

Item 22 is a curable precursor according to any of the preceding items, wherein the at least one acid-functional group derived from phosphoric acid comprises at least one P—OH group.

Item 23 is a curable precursor according to any of the preceding items, wherein the at least one acid-functional group derived from phosphoric acid is selected from the group consisting of monoesters of phosphoric acid, diesters of phosphoric acid, diesters of diphosphoric acid, and any combinations or mixtures thereof.

Item 24 is a curable precursor according to any of the preceding items, wherein the at least one acid-functional group derived from phosphoric acid is selected from the group consisting of monoesters of phosphoric acid and $C_1$-$C_6$ polyol derivatives, diesters of phosphoric acid and $C_1$-$C_6$ polyol derivatives, diesters of diphosphoric acid and $C_1$-$C_6$ polyol derivatives, and any combinations or mixtures thereof.

Item 25 is a curable precursor according to any of the preceding items, wherein the at least one acid-functional group derived from phosphoric acid is selected from the group consisting of monoesters of phosphoric acid and derivatives of 1,3-isomer of glycerol, diesters of phosphoric acid and derivatives of 1,3-isomer of glycerol, diesters of diphosphoric acid and derivatives of 1,3-isomer of glycerol, and any combinations or mixtures thereof.

Item 26 is a curable precursor according to any of the preceding items, wherein the at least one acid-functional group derived from phosphoric acid is selected from the group consisting of monoesters of phosphoric acid and derivatives of 1,2-isomer of glycerol, diesters of phosphoric acid and derivatives of 1,2-isomer of glycerol, diesters of diphosphoric acid and derivatives of 1,2-isomer of glycerol, and any combinations or mixtures thereof.

Item 27 is a curable precursor according to any of the preceding items, wherein the crosslinker for the (meth) acrylate-based (co)polymer base component comprises at least two free-radical (co)polymerizable reactive groups.

Item 28 is a curable precursor according to any of the preceding items, wherein the at least one free-radical (co) polymerizable reactive group of the crosslinker is selected from the group consisting of ethylenically unsaturated groups.

Item 29 is a curable precursor according to item 28, wherein the ethylenically unsaturated groups are selected from the group consisting of (meth)acrylic groups, vinyl groups, styryl groups, and any combinations or mixtures thereof.

Item 30 is a curable precursor according to any of item 28 or 29, wherein the ethylenically unsaturated groups are selected from the group consisting of methacrylic groups, acrylic groups, and any combinations or mixtures thereof.

Item 31 is a curable precursor according to any of items 28 to 30, wherein the ethylenically unsaturated groups are selected from the group of methacrylic groups.

Item 32 is a curable precursor according to any of the preceding items, wherein the crosslinker for the (meth) acrylate-based (co)polymer base component is an ethylenically unsaturated compound.

Item 33 is a curable precursor according to any of the preceding items, wherein the crosslinker for the (meth) acrylate-based (co)polymer base component comprises the reaction product(s) of the reaction of phosphoric acid with either 1,3-glycerol dimethacrylate or 1,2-glycerol dimethacrylate.

Item 34 is a curable precursor according to any of the preceding items, wherein the crosslinker for the (meth) acrylate-based (co)polymer base component is selected from the group consisting of 1,3-glycerol dimethacrylate phosphate monoester, 1,2-glycerol dimethacrylate phosphate monoester, 1,3-glycerol dimethacrylate phosphate diester, 1,2-glycerol dimethacrylate phosphate diester, 1,3-glycerol dimethacrylate diphosphate diester, 1,2-glycerol dimethacrylate diphosphate diester, and any mixtures thereof.

Item 35 is a curable precursor according to any of the preceding items, which comprises from 0.01 to 10 wt. %, from 0.01 to 8 wt. %, from 0.05 to 6 wt. %, from 0.05 to 5 wt. %, from 0.05 to 4 wt. %, from 0.1 to 2 wt. %, or even from 0.1 to 1 wt. %, of the crosslinker for the (meth)acrylate-based (co)polymer base component, wherein the weight percentages are based on the total weight of the curable precursor.

Item 36 is a curable precursor according to any of the preceding items, wherein the crosslinker for the (meth) acrylate-based (co)polymer base component is (co)polymerizable with monomer units (i) and/or (ii) and/or (iii) of the (meth)acrylate-based (co)polymer base component.

Item 37 is a curable precursor according to any of the preceding items, wherein the polyether oligomer having a number average molecular weight of at least 2000 g/mol comprises a (linear) polyether backbone and further comprises at least one free-radical (co)polymerizable reactive group.

Item 38 is a curable precursor according to any of the preceding items, wherein the polyether oligomer has a number average molecular weight greater than 2000 g/mol, greater than 2500 g/mol, greater than 3000 g/mol, greater than 3500 g/mol, or even greater than 4000 g/mol.

Item 39 is a curable precursor according to any of the preceding items, wherein the polyether oligomer has a number average molecular weight greater no greater than 10.000 g/mol, no greater than 9500 g/mol, no greater than 9000 g/mol, no greater than 8500 g/mol, or even no greater than 8000 g/mol.

Item 40 is a curable precursor according to any of the preceding items, wherein the polyether oligomer has a number average molecular weight in a range from 2000 to 20,000 g/mol, from 2000 to 15.000 g/mol, from 2000 to 12,000 g/mol, from 2500 to 10.000 g/mol, from 2500 to 9.000 g/mol, from 3000 to 8500 g/mol, from 3500 to 8000 g/mol or even from 4000 to 8000 g/mol.

Item 41 is a curable precursor according to items 37 to 40, wherein the (linear) polyether oligomer backbone is obtained by copolymerization of tetrahydrofuran units, ethylene oxide units, and optionally propylene oxide units.

Item 42 is a curable precursor according to any of the preceding items, wherein the polyether oligomer comprises at least two free-radical (co)polymerizable reactive groups.

Item 43 is a curable precursor according to any of the preceding items, wherein the at least one free-radical (co) polymerizable reactive group of the polyether oligomer is selected from the group consisting of ethylenically unsaturated groups.

Item 44 is a curable precursor according to item 43, wherein the ethylenically unsaturated groups are selected from the group consisting of (meth)acrylic groups, vinyl groups, styryl groups, and any combinations or mixtures thereof.

Item 45 is a curable precursor according to any of item 43 or 44, wherein the ethylenically unsaturated groups are selected from the group consisting of methacrylic groups, acrylic groups, and any combinations or mixtures thereof.

Item 46 is a curable precursor according to any of items 43 to 45, wherein the ethylenically unsaturated groups are selected from the group of methacrylic groups.

Item 47 is a curable precursor according to any of the preceding items, wherein the polyether oligomer is an ethylenically unsaturated compound.

Item 48 is a curable precursor according to any of the preceding items, wherein the polyether oligomer has the following formula:

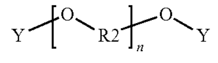

wherein:

Y is a free-radical (co)polymerizable reactive group, in particular an ethylenically unsaturated group;

each $R^2$ is independently selected from the group consisting of alkylene groups having in particular from 2 to 6 carbons;

and n is an integer selected such that the calculated number average molecular weight of the polyether oligomer is of at least 2000 g/mol.

Item 49 is a curable precursor according to any of the preceding items, wherein the polyether oligomer has the following formula:

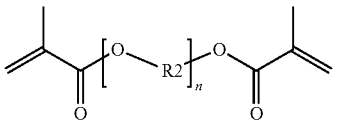

wherein:

each $R^2$ is independently selected from the group consisting of alkylene groups having from 2 to 6 carbon atoms; and n is an integer selected such that the calculated number average molecular weight of the polyether oligomer is in particular in a range from 2000 to 20.000 g/mol.

Item 50 is a curable precursor according to any of item 48 or 49, wherein the polyether oligomer has the following formula:

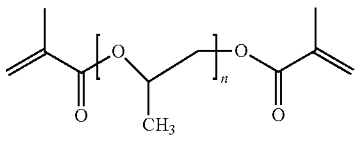

Item 51 is a curable precursor according to item 48, wherein the polyether oligomer has the following formula:

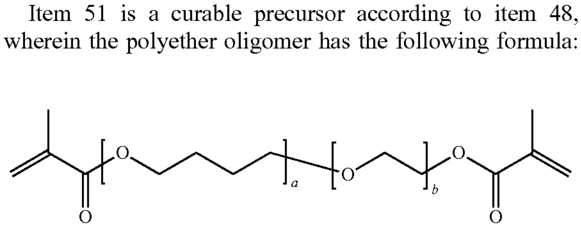

wherein a and b are integers greater than or equal to 1, the sum of a and b is equal to n, and wherein n is in particular selected such that the calculated number average molecular weight of the polyether oligomer is in a range from 2000 to 20.000 g/mol.

Item 52 is a curable precursor according to item 51, wherein the linear polyether oligomer backbone is obtained by copolymerization of tetrahydrofuran units and ethylene oxide units, wherein the mole ratio of these monomer units is in a range from 1:2.5 to 1:5, or even from 1:3 to 1:4.

Item 53 is a curable precursor according to any of the preceding items, which comprises from 1 to 15 wt. %, from 2 to 12 wt. %, from 3 to 10 wt. %, from 4 to 10 wt. %, or even from 5 to 10 wt. %, of the polyether oligomer, wherein the weight percentages are based on the total weight of the curable precursor.

Item 54 is a curable precursor according to any of the preceding items, wherein the polyether oligomer is (co) polymerizable with monomer units (i) and/or (ii) and/or (iii) of the (meth)acrylate-based (co)polymer base component.

Item 55 is a curable precursor according to any of the preceding items, wherein the thermally conductive particulate material is selected from the group consisting of metal oxides, metal nitrides, metal hydroxides, metallic particles, coated metallic particles, ceramic particles, coated ceramic particles, and any combinations or mixtures thereof.

Item 56 is a curable precursor according to any of the preceding items, wherein the thermally conductive particulate material is selected from the group consisting of aluminum oxide, aluminum hydroxide, boron nitride, aluminum nitride, silicon nitride, gallium nitride, silicon oxide, magnesium oxide, zinc oxide, zirconium oxide, tin oxide, copper oxide, chromium oxide, titanium oxide, silicon carbide, graphite, magnesium hydroxide, calcium hydroxide, carbon nanotubes, carbon black, carbon fibers, diamond, clay, aluminosilicate, calcium carbonate, barium titanate, potassium titanate, copper, silver, gold, nickel, aluminum, platinum, and any combinations or mixtures thereof.

Item 57 is a curable precursor according to any of the preceding items, wherein the thermally conductive particulate material is selected from the group consisting of aluminum oxide, aluminum hydroxide, boron nitride, and any combinations or mixtures thereof.

Item 58 is a curable precursor according to any of the preceding items, wherein the thermally conductive particulate material is selected from the group consisting of aluminum oxide, aluminum hydroxide, and any combinations or mixtures thereof.

Item 59 is a curable precursor according to any of the preceding items, wherein the thermally conductive particulate material takes a physical form selected from the group of primary particles, primary particle agglomerates, and any combinations or mixtures thereof.

Item 60 is a curable precursor according to item 58, wherein the thermally conductive primary particles and primary particle agglomerates have a shape selected from the group consisting of isotropic shapes, anisotropic shapes, and any combinations or mixtures thereof.

Item 61 is a curable precursor according to any item 59 or 60, wherein the thermally conductive primary particles and primary particle agglomerates have a shape selected from the group consisting of spherical, platelet, and any combinations or mixtures thereof.

Item 62 is a curable precursor according to any of the preceding items, wherein the thermally conductive particulate material comprises a mixture of thermally conductive primary particles and primary particle agglomerates having dissimilar shapes and sizes.

Item 63 is a curable precursor according to any of the preceding items, wherein the thermally conductive particulate material comprises thermally conductive particles provided with a surface functionalization.

Item 64 is a curable precursor according to item 63, wherein the surface functionalization has a polarity selected from the group consisting of acidic-functional, basic-functional, hydrophobic, hydrophilic, and any combinations or mixtures thereof.

Item 65 is a curable precursor according to any of item 63 or 64, wherein the surface functionalization of the thermally conductive particulate material comprises hydrophobic surface functionalization.

Item 66 is a curable precursor according to any of items 63 to 65, wherein the surface functionalization of the thermally conductive particles has (substantially) the same polarity as the functional group of the optionally (high Tg) ethylenically unsaturated monomer units which are copolymerizable with monomer units (i) and/or (ii) of the (meth) acrylate-based (co)polymer base component.

Item 67 is a curable precursor according to any of items 63 to 65, wherein the surface functionalization of the thermally conductive particles has (substantially) a polarity opposite to the functional group of the optionally (high Tg) ethylenically unsaturated monomer units which are copolymerizable with monomer units (i) and/or (ii) of the (meth) acrylate-based (co)polymer base component.

Item 68 is a curable precursor according to any of the preceding items, wherein the thermally conductive particulate material further has any of flame-retardancy properties, electrical insulation properties, and any combinations thereof.

Item 69 is a curable precursor according to any of the preceding items, which comprises from 40 to 95 wt. %, from 50 to 95 wt. %, from 50 to 90 wt. %, from 60 to 90 wt. %, from 60 to 85 wt. %, or even from 70 to 85 wt. %, of the thermally conductive particulate material, wherein the weight percentages are based on the total weight of the curable precursor.

Item 70 is a curable precursor according to any of the preceding items, which comprises at least 30% by volume, at least 50% by volume, at least 65% by volume, or even at least 70% by volume, of the thermally conductive particulate material, wherein the volume percentages based on the total volume of the curable composition.

Item 71 is a curable precursor according to any of the preceding items, which comprises from 30 to 75% by volume, from 40 to 70% by volume, from 50 to 70% by volume, or even from 60 to 70% by volume, of the thermally conductive particulate material, wherein the volume percentages based on the total volume of the curable composition.

Item 72 is a curable precursor according to any of the preceding items, which further comprises a free-radical polymerization initiator.

Item 73 is a curable precursor according to any of the preceding items, which comprises:

a) from 1 to 15 wt. %, from 2 to 12 wt. %, from 3 to 10 wt. %, from 4 to 10 wt. %, or even from 5 to 10 wt. %, of the (meth)acrylate-based (co)polymer base component, a (meth)acrylate-based (co)polymer base component;
b) from 0.01 to 10 wt. %, from 0.01 to 8 wt. %, from 0.05 to 6 wt. %, from 0.05 to 5 wt. %, from 0.05 to 4 wt. %, from 0.1 to 2 wt. %, or even from 0.1 to 1 wt. %, of the crosslinker for the (meth)acrylate-based (co)polymer base component;
c) from 1 to 15 wt. %, from 2 to 12 wt. %, from 3 to 10 wt. %, from 4 to 10 wt. %, or even from 5 to 10 wt. %, of the polyether oligomer;
d) from 40 to 95 wt. %, from 50 to 95 wt. %, from 50 to 90 wt. %, from 60 to 90 wt. %, from 60 to 85 wt. %, or even from 70 to 85 wt. %, of the thermally conductive particulate material; and
e) a free-radical polymerization initiator;

wherein the weight percentages are based on the total weight of the curable precursor.

Item 74 is a curable precursor according to any of the preceding items, which is (substantially) free of any of plasticizer(s), thixotropic agent(s), silicon-based compounds, halogen-based compounds, isocyanate-based compounds, and any combinations or mixtures thereof.

Item 75 is a curable precursor according to any of the preceding items, which is (substantially) free of solvent(s).

Item 76 is a curable precursor according to any of the preceding items, which is in the form of a two-part composition having a first part and a second part, wherein the first part and the second part are kept separated prior to combining the two parts and forming the (free-radical) cured composition.

Item 77 is a curable precursor according to any of the preceding items, which is curable at 23° C. at a curing percentage greater than 90%, greater than 95%, greater than 98%, or even greater than 99%, after a curing time no greater than 72 hours, no greater than 48 hours, or even no greater than 24 hours.

Item 78 is a curable precursor according to any of the preceding items, which is curable without using any actinic radiation, in particular UV light.

Item 79 is a curable precursor according to any of the preceding items, which is curable without using any additional thermal energy.

Item 80 is a curable precursor according to any of the preceding items, which is a thermally-conductive gap filler composition.

Item 81 is a curable precursor according to any of the preceding items, which has a thermal conductivity of at least 0.1 W/mK, at least 0.2 W/mK, at least 0.5 W/mK, at least 0.7 W/mK, at least 1.0 W/mK, at least 1.2 W/mK, at least 1.5 W/mK, at least 1.7 W/mK, or even at least 2.0 W/mK, when measured according to the test method described in the experimental section.

Item 82 is a curable precursor according to any of the preceding items, which has a thermal conductivity in a range from 0.1 to 5.0 W/mK, from 0.2 to 5.0 W/mK, from 0.2 to 4.0 W/mK, from 0.5 to 4.0 W/mK, from 0.5 to 3.0 W/mK, or even from 1.0 to 2.5 W/mK, when measured according to the test method described in the experimental section.

Item 83 is a curable precursor according to any of the preceding items, which has an overlap shear strength (OLS) of at least 2.0 MPa, at least 2.5 MPa, at least 3.0 MPa, at least 3.5 MPa, at least 4.0 MPa, at least 4.5 MPa, at least 5.0 MPa, or even at least 5.5 MPa, when measured according to the test method described in the experimental section.

Item 84 is a curable precursor according to any of the preceding items, which has an overlap shear strength (OLS) in a range from 2.0 to 8.0 MPa, from 2.5 to 8.0 MPa, from 2.5 to 7.0 MPa, from 3.0 to 7.0 MPa, from 3.5 to 6.5 MPa, or even from 4.0 to 6.0 MPa, when measured according to the test method described in the experimental section.

Item 85 is a curable precursor according to any of the preceding items, which has a tensile strength of at least 3.0 MPa, at least 3.5 MPa, at least 4.0 MPa, at least 4.5 MPa, at least 5.0 MPa, at least 5.5 MPa, at least 6.0 MPa, or even at least 6.5 MPa, when measured according to the test method described in the experimental section.

Item 86 is a curable precursor according to any of the preceding items, which has a tensile strength in a range from 2.0 to 10.0 MPa, from 2.5 to 8.0 MPa, from 3.0 to 8.0 MPa, from 3.5 to 8.0 MPa, from 3.5 to 7.5 MPa, or even from 4.0 to 7.0 MPa, when measured according to the test method described in the experimental section.

Item 87 is a curable precursor according to any of the preceding items, which has an elongation at break of at least 5%, at least 8%, at least 10%, at least 12%, at least 15%, or even at least 18%, when measured according to the test method described in the experimental section.

Item 88 is a curable precursor according to any of the preceding items, which has a complex viscosity no greater than 50 Pa·s, no greater than 45 Pa·s, no greater than 40 Pa·s, no greater than 35 Pa·s, or even no greater than 30 Pa·s, when measured according to test method DIN 54458 at test sequence T4 and under analysis point A4.

Item 89 is a curable precursor according to any of the preceding items, which has a complex viscosity in a range from 5 to 50 Pa·s, from 5 to 45 Pa·s, from 10 to 45 Pa·s, from 15 to 45 Pa·s, from 15 to 40 Pa·s, from 20 to 40 Pa·s, from 25 to 40 Pa·s, or even from 25 to 35 Pa·s, when measured according to test method DIN 54458 at test sequence T4 and under analysis point A4.

Item 90 is a curable precursor according to any of the preceding items, which has a dosing speed of at least 2.0 ml/s, at least 2.5 ml/s, at least 3.0 ml/s, at least 3.5 ml/s, at least 4.0 ml/s, at least 4.5 ml/s, at least 5.0 ml/s, at least 5.5 ml/s, at least 6.0 ml/s, or even at least at least 6.5 ml/s, when measured according to the test method described in the experimental section.

Item 91 is a battery module comprising a plurality of battery cells connected to a first base plate by a first layer of a first curable precursor according to any of the preceding items.

Item 92 is a battery subunit comprising a plurality of battery modules connected to a second base plate by a second layer of a second curable precursor, wherein each battery module comprises a plurality of battery cells connected to a first base plate by a first layer of a curable precursor, wherein the first curable composition and the second curable precursor are independently selected, and wherein each is a curable precursor according to any of items 1 to 90.

Item 93 is a battery module or a battery subunit according any of item 91 or 92, wherein each of the first and second curable precursor is a thermally-conductive gap filler composition.

Item 94 is a method of manufacturing a battery module, which comprises the steps of:

a) applying a first layer of a first curable precursor according to any of items 1 to 90 to a first surface of a first base plate;

b) attaching a plurality of battery cells to the first layer to connect the battery cells to the first base plate; and
c) curing the first curable precursor or allowing the first curable precursor to cure.

Item 95 is a method of manufacturing a battery subunit, which comprises the steps of:
a) applying a second layer of a second curable precursor according to any of items 1 to 90 to a first surface of a second base plate;
b) attaching a plurality of battery modules to the second layer to connect the battery modules to the second base plate; and
c) curing the second curable precursor or allowing the second curable precursor to cure.

Item 96 is a curing system suitable for a (free-radical) curable precursor of a (semi-structural) adhesive composition comprising a polyether oligomer having a number average molecular weight of at least 2000 g/mol and which comprises at least one free-radical (co)polymerizable reactive group, wherein the curing system comprises a crosslinker comprising at least one acid-functional group derived from phosphoric acid and at least one free-radical (co) polymerizable reactive group.

Item 97 is a curing system according to item 96, wherein the crosslinker is as described in any of items 21 to 36, and the polyether oligomer is in particular as described in any of items 37 to 54.

Item 98 is a method of manufacturing a (free-radical) curable precursor of a (semi-structural) adhesive composition, comprising the steps of:
a) providing a (meth)acrylate-based (co)polymer base component comprising the free-radical (co)polymerization reaction product of a (co)polymerizable material comprising (low Tg) $C_1$-$C_{32}$ (meth)acrylic acid ester monomer units;
b) providing a polyether oligomer having a number average molecular weight of at least 2000 g/mol and which comprises at least one free-radical (co)polymerizable reactive group;
c) providing a crosslinker for the (meth)acrylate-based (co)polymer base component, which comprises at least one acid-functional group derived from phosphoric acid and at least one free-radical (co)polymerizable reactive group; and
d) combining the base component, the polyether oligomer and the crosslinker.

Item 99 is a method according to item 98, wherein the crosslinker is as described in any of items 21 to 36, and the polyether oligomer is in particular as described in any of items 37 to 54.

Item 100 is the use of a (free-radical) curable precursor according to any of items 1 to 90, for industrial applications, in particular for automotive applications, in particular for thermal management applications in the automotive industry.

Item 101 is the use of a (free-radical) curable precursor according to any of items 1 to 90, for the manufacturing of a thermally-conductive gap filler composition.

Item 102 the use of a (free-radical) curable precursor according to any of items 1 to 90, for the manufacturing of a battery module comprising a plurality of battery cells, in particular for use in the automotive industry.

Item 103 is the use of a curing system according to any of item 96 or 97, for the manufacturing of a (free-radical) curable composition, in particular comprising a polyether oligomer having a number average molecular weight of at least 2000 g/mol and which comprises at least one free-radical (co)polymerizable reactive group.

Item 104 is the use of a curing system according to any of item 96 or 97, for thermal management applications, in particular in the automotive industry.

Item 105 is the use of a curing system according to any of item 96 or 97, for the manufacturing of a thermally-conductive gap filler composition.

Item 106 is the use of a curing system according to any of item 96 or 97, for the manufacturing of a battery module comprising a plurality of battery cells, in particular for use in the automotive industry.

Item 107 is the use according to any of items 100 to 106, in combination with a polyether oligomer having a number average molecular weight of at least 2000 g/mol and which comprises at least one free-radical (co)polymerizable reactive group.

EXAMPLES

The present disclosure is further illustrated by the following examples. These examples are merely for illustrative purposes only and are not meant to be limiting on the scope of the appended claims.

Test Methods

Preparation of the Formulations for Testing:

The curable precursor compositions are prepared from a 1:1 (vol ratio) mixture of two components (Part B and Part A) extruded from a 2K cartridge using a static mixer (standard 3M gold Quadro nozzle for 50 mL cartridges or SULZER MF 10-18 nozzles for 200 mL cartridges) The preparation of both parts is described hereinafter. Within the open time, the obtained paste is applied to the surface of the test panel as a film having a thickness of about 2 mm. The surface of test samples for the overlap shear strength test (aluminum, grade EN AW2024T3) are sandblasted before bonding using pure corundum with a grain size of about 135 micrometers. The test samples are left at ambient room temperature (23° C.+/−2° C., 50% relative humidity +/−5%) for 7 days and then placed into an air circulating oven for 30 minutes at 80° C. prior to testing and the various performance testing are measured as described below.

Preparation of the Test Samples for Ageing Testing:

The samples are prepared as described previously, at the exception that the test samples are—prior to testing—previously submitted to cyclic climatic ageing procedure according PR308.2 (BMW). After appropriate ageing, the test samples are reconditioned in a constant climate room for 24 hours and the performance is measured as described above.

1) Thermal Conductivity Test

The thermal conductivity of the cured compositions is measured at 23° C. with Laser Flash Analysis (LFA) using Light Flash Apparatus LFA 467 HyperFlash®, commercially available from Netzsch GmbH, Germany, on samples having a thickness of 2 mm.

2) Overlap Shear Strength (OLS) According to DIN EN 1465.

Overlap shear strength is determined according to DIN EN 1465 using a Zwick Z050 tensile tester (commercially available by Zwick GmbH & Co. KG, Ulm, Germany) operating at a cross head speed of 10 mm/min. For the preparation of an overlap shear strength test assembly, the paste resulting from the mixing of Part A and Part B is spackled onto one surface of a test panel. The aluminum EN AW2024T3 test panels are sandblasted before bonding. Afterwards, the sample is covered by a second aluminum strip forming an overlap joint of 13 mm. Hereby, the use of glass beads having a selected diameter distribution ensured formation of a bond line having a thickness of about 300 micrometers. The overlap joints are then clamped together using two binder clips and the test assemblies are further stored at room temperature for 7 days after bonding, and then placed into an air circulating oven for 30 minutes at 80° C. The samples are either tested directly at room temperature or undergo ageing and are tested thereafter. Five samples are measured for each of the examples and results averaged and reported in MPa.

3) Tensile Strength and Elongation at Break According to DIN EN ISO 527-2-5A.

Tensile measurements (tensile strength and elongation at break) are carried out according to DIN ISO 527-2-5A using a Zwick Z050 tensile tester (commercially available by Zwick GmbH & Co. KG, Ulm, Germany) operating at a cross head speed of 10 mm/min. Films having a thickness of about 2 mm are prepared according to the procedure described above. Five samples having a dog bone shape are stamped according to the geometry of DIN ISO 527-2-5A and used for further mechanical testing. Measurements are done for each of the samples and the results are averaged and reported in MPa for the tensile strength and in percentage for the elongation at break.

4) Complex Viscosity According to DIN EN 54 458.

Figure 4:
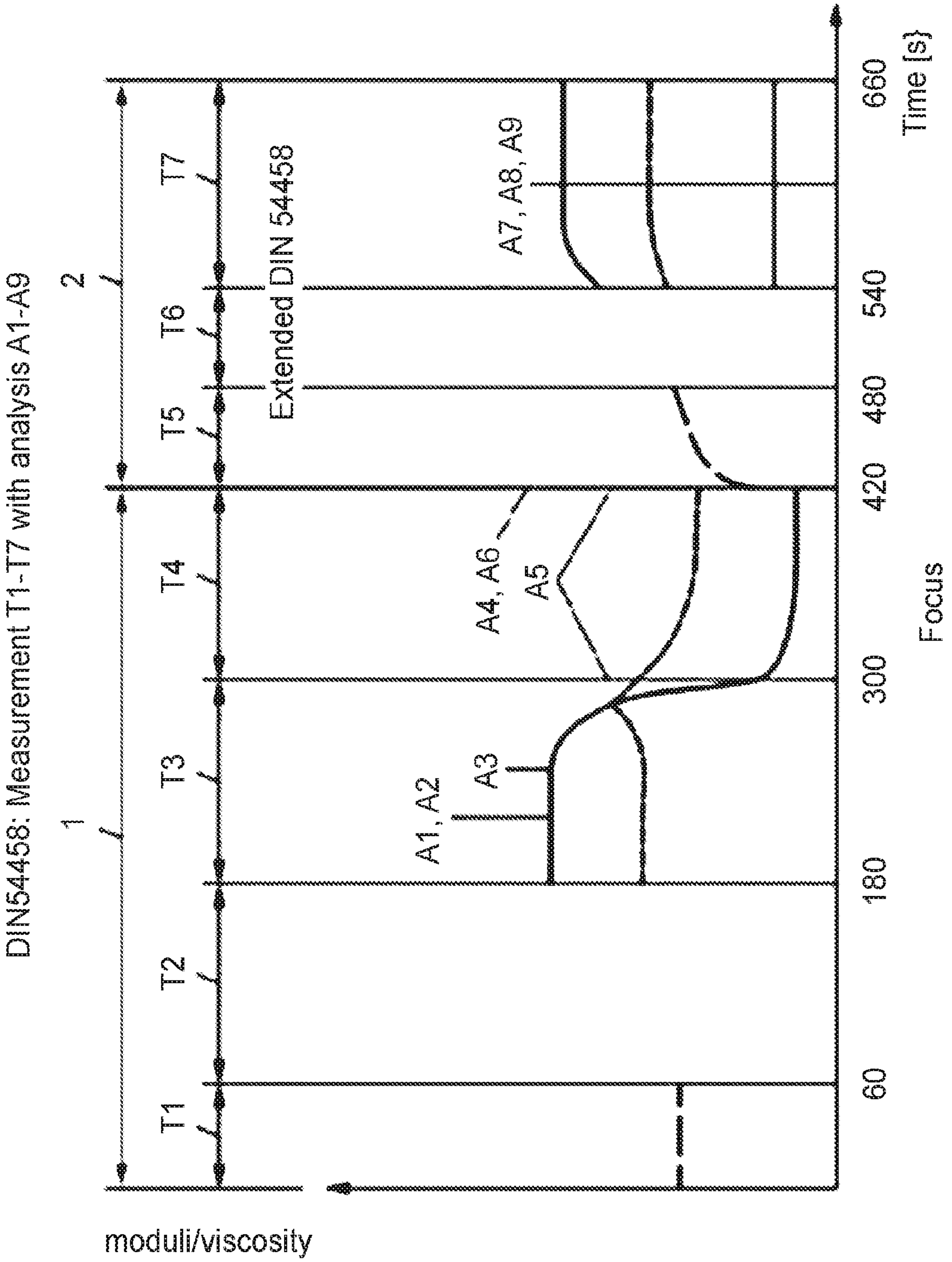
FIG. 4 is a graphical overview of test sequences (T) and analysis points (A) of Test Method DIN EN 54 458.

Complex viscosity of the test samples is measured at 23° C. according to DIN 54 458 at test sequence T4 and under analysis point A4 with Anton Paar rheometer MCR 302 using RheoCompass software from Anton Paar. Analysis mode A4 describes the complex viscosity under high deformation and high frequency. FIG. 4 provides a graphical overview of the various test sequences (T) and analysis points (A) of Test Method DIN EN 54 458.

5) Dosing Speed.

Dosing speed of the test samples is measured by dispensing the sample with dispenser ViscoDuo-VM 12/12 and dosed with 2K-control ViscoDos4000T-2K-Touch (commercially available from ViscoTec GmbH, Germany). The dosing speed is measured by using a rotor rotation of about 120 rpm and a dosing pressure of 13.5 bar.

Raw Materials

In the examples, the following raw materials are used:

2-Ethylhexylacrylate (2-EHA) is obtained from BASF AG, Germany.

2-Ethylhexylmethacrylate (2-EHMA) is obtained from BASF AG, Germany.

Acrylic acid (AA) is obtained from Sigma-Aldrich, Germany.

Butyl acrylate (n-BuA) is obtained from Sigma-Aldrich, Germany.

Isobornyl acrylate (IBOA) is obtained from BASF AG, Germany.

D-600-DMA is a dimethacrylate polyether oligomer having a number average molecular weight of about 600 g/mol, and which is obtained from 3M Espe GmbH, Germany.

GLP is a dimethacrylate crosslinker derived from phosphoric acid, and which is obtained from 3M Espe GmbH, Germany.

Martoxid TM 2250 is an aluminum oxide-based thermally conductive filler, which is obtained from Martinswerk, Germany.

Martoxid TM 1250 is an aluminum oxide-based thermally conductive filler, which is obtained from Martinswerk, Germany.

BAK70 is spherical aluminum oxide-based thermally conductive filler, which is obtained from Bestry, China.

Apyral 200SM is aluminum hydroxide-based mineral flame retardant

Disperse BYK 145 is a dispersing agent, which is obtained from BYK, Germany.

Lithene AH is a liquid polybutadiene, which is obtained from Synthomer GmbH, Germany.

Peroxan BP-50-red is a free-radical polymerization initiator, which is obtained from Pergan GmbH, Germany.

Peroxan BP-40-LV is a free-radical polymerization initiator, which is obtained from Pergan GmbH, Germany.

Pergaquick PQ A150 is an amine-based free-radical polymerization accelerator, which is obtained from Pergan GmbH, Germany.

Irgazin Red L 36701ID is a red pigment, which is obtained from BASF AG, Germany.

EXAMPLES

General Preparation Method of Exemplary Thermally-Conductive Gap Filler Compositions (Examples 1-4) and Comparative Examples (CE1-CE2) for Testing The exemplary 2-component (Part A and Part B) curable compositions according to the present disclosure are prepared separately by combining the ingredients from the list of materials of Table 1 in a high-speed mixer (DAC 150 FVZ Speedmixer, available from Hauschild Engineering, Germany) stirring at 3500 rpm for 0.5 minutes until a homogeneous mixture is achieved. The material is then slightly degassed to avoid entrapped air. The acrylic acid ester monomer units, the polyether oligomer and the crosslinker are added first, followed by the various thermally conductive particulate material in successive steps. The free-radical polymerization initiator and the crosslinker are present solely in Part B, while the amine-based free-radical polymerization accelerator is present solely in Part A. During the mixing, the temperature of the mixing shall not exceed 45° C.

Afterwards, the two parts are filled into a 1:1 (vol ratio) 2K cartridge and the mixture applied to the surface of the test panel as described above. In Table 1, all concentrations are given as wt. %. Comparative example CE1 does not comprise any crosslinker. Comparative example CE2 does not comprise any polyether oligomer.

TABLE 1

| | Weight % | | | | | |
|---|---|---|---|---|---|---|
| Raw material | Ex.1 | Ex.2 | Ex.3 | Ex.4 | Ex.CE1 | Ex.CE2 |
| PART B | | | | | | |
| 2-EHA | 7.97 | — | — | 9.10 | 8.24 | 7.92 |
| n-BuA | — | 7.6 | 3.41 | — | — | — |
| AA | 0.54 | 0.50 | 0.73 | 0.54 | — | 0.54 |
| 2-EHMA | 0.53 | 0.50 | — | — | — | 8.46 |
| IBOA | — | — | — | 0.21 | — | — |
| D-6000-DMA | 8.02 | 7.60 | 7.05 | 9.05 | 9.06 | — |
| GLP | 1.06 | 0.40 | 0.40 | 1.10 | — | 0.97 |
| TM 2250 | 65.36 | 64.22 | 63.48 | 64.20 | 65.31 | 35.00 |
| TM 1250 | — | — | — | — | — | 30.00 |
| BAK 70 | 10.02 | 12.80 | 12.50 | 9.00 | 10.75 | 10.61 |
| A-200SM | 5.98 | 6.00 | 6.00 | 6.40 | 6.03 | 5.96 |

TABLE 1-continued

| | Weight % | | | | | |
|---|---|---|---|---|---|---|
| Raw material | Ex.1 | Ex.2 | Ex.3 | Ex.4 | Ex.CE1 | Ex.CE2 |
| BYK 145 | 0.10 | 0.15 | 0.15 | 0.10 | 0.20 | 0.12 |
| Lithene AH | — | — | 0.50 | — | — | — |
| BP-40-LV | — | 0.22 | 0.30 | — | — | — |
| BP-50-red | 0.21 | — | — | 0.10 | 0.34 | 0.34 |
| Irgazin Red 3670HD | 0.21 | — | — | 0.20 | 0.04 | 0.04 |
| PART A | | | | | | |
| 2-EHA | 8.57 | — | — | 9.28 | 8.31 | 8.14 |
| n-BuA | — | 7.72 | 8.30 | — | — | — |
| AA | 0.55 | 0.50 | 0.50 | 0.58 | — | 0.55 |
| 2-EHMA | 0.57 | 0.50 | — | — | — | 8.65 |
| IBOA | — | — | — | 0.22 | — | — |
| D-6000-DMA | 8.51 | 7.62 | 8.25 | 9.28 | 8.31 | — |
| TM 2250 | 65.31 | 64.41 | 63.50 | 64.72 | 65.88 | 35.13 |
| TM1250 | — | — | — | — | — | 30.12 |
| BAK 70 | 10.00 | 12.87 | 12.50 | 9.06 | 10.84 | 10.85 |
| A-200SM | 6.12 | 6.02 | 6.00 | 6.47 | 6.08 | 6.00 |
| BYK 145 | 0.10 | 0.16 | 27 | 0.11 | 0.10 | 0.09 |
| Lithene AH | — | — | 0.50 | — | — | — |
| PQ A150 | 0.27 | 0.21 | 0.31 | 0.28 | 0.47 | 0.465 |

Mechanical and Thermal Conductivity Performance

TABLE 2

Results of the mechanical and thermal conductivity tests.

| | Ex. 1 | Ex. 2 | Ex. 3 | Ex. 4 | Ex. CE1 |
|---|---|---|---|---|---|
| OLS (MPa) | 5.1 | 2.8 | 4.4 | 5.0 | 0.22 |
| Tensile strength (MPa) | 5.2 | 4.9 | 5.0 | 5.3 | 2.2 |
| Elongation at break (%) | 12.6 | 7.6 | 10.4 | 18.4 | 19 |
| Thermal conductivity (W/mK) | 1.48 | 2.06 | 1.52 | 1.28 | 1.2 |

As can be seen from the results shown in Table 2, the thermally-conductive gap filler compositions according to the present disclosure provide excellent performance and characteristics as to mechanical properties and thermal conductivity. In contrast, the composition of comparative example CE1 (not according to the disclosure) is deficient at least in terms of OLS strength and tensile strength.

Mechanical Performance Upon Ageing

The mechanical performance of various compositions is also tested upon cyclic climatic ageing procedure according PR308.2 (BMW).

TABLE 3

Results of the mechanical tests upon ageing.

| | Ex. 1 | Ex. 2 | Ex. 3 |
|---|---|---|---|
| OLS (MPa) | 5.8 | 3.4 | 4.9 |
| Tensile strength (MPa) | 5.9 | 6.5 | 6.5 |
| Elongation at break (%) | 10.4 | 6.3 | 7.8 |

As can be seen from the results shown in Table 3, the thermally-conductive gap filler compositions according to the present disclosure provide even improved OLS and tensile strength performance upon ageing conditions. As expected though, the elongation at break performance (elasticity) is slightly reduced upon ageing.

Viscosity Characteristics and Pumpability Performance

The complex viscosity of Parts B of various compositions is also measured according to the procedure described above.

TABLE 4

Results of the complex viscosity tests.

| | Ex. 1 | Ex. CE2 |
|---|---|---|
| Complex viscosity (Pa · s) | 32 | 2.5 |

As can be seen from the results shown in Table 4, the thermally-conductive gap filler compositions according to the present disclosure provide excellent viscosity characteristics which translate into excellent pumpability characteristics. In contrast, the composition of comparative example CE2 (not according to the disclosure) provides very low complex viscosity which makes it unsuitable in regular pumping conditions.

Dosing Speed and Dispensability Performance

The dosing speed of the composition of Ex.1 is also measured according to the procedure described above.

TABLE 5

Results of the dosing speed test.

| | Ex. 1 |
|---|---|
| Dosing speed (ml/s) | 6.7 |

As can be seen from the results shown in Table 5, the thermally-conductive gap filler compositions according to the present disclosure provide excellent dosing speed which translate into excellent dispensability characteristics.

The invention claimed is:

1. A curable precursor of an adhesive composition, comprising:

a) a (meth)acrylate-based (co)polymer base component comprising the free-radical (co)polymerization reaction product of a (co)polymerizable material comprising:

i. $C_1$-$C_{32}$ (meth)acrylic acid ester monomer units;

ii. optionally, $C_1$-$C_{18}$ methacrylic acid ester monomer units; and iii. optionally, ethylenically unsaturated monomer units having a functional group and which are copolymerizable with monomer units (i) and/or (ii);

b) a crosslinker for the (meth)acrylate-based (co)polymer base component, which comprises at least one acid-functional group derived from phosphoric acid and at least one free-radical (co)polymerizable reactive group;

c) a polyether oligomer having a number average molecular weight of at least 2000 g/mol and which comprises at least one free-radical (co)polymerizable reactive group; and d) a thermally conductive particulate material, wherein the at least one acid-functional group derived from phosphoric acid is selected from the group consisting of monoesters of phosphoric acid and derivatives of 1,3-isomer of glycerol, diesters of phosphoric acid and derivatives of 1,3-isomer of glycerol, diesters of diphosphoric acid and derivatives of 1,3-isomer of glycerol, and any combinations or mixtures thereof.

2. A curable precursor according to claim 1, wherein the $C_1$-$C_{32}$ (meth)acrylic acid ester monomer units are selected from the group consisting of iso-octyl (meth)acrylate, 2-ethylhexyl (meth)acrylate, 2-propylheptyl (meth)acrylate, butyl (meth)acrylate, and any mixtures thereof.

3. A curable precursor according to claim 1, wherein the ethylenically unsaturated monomer units having a functional group have a functional group selected from the group consisting of acid, amine, hydroxyl, amide, isocyanate, acid anhydride, epoxide, nitrile, and any combinations thereof.

4. A curable precursor according to claim 1, wherein the at least one acid-functional group derived from phosphoric acid comprises at least one P—OH group.

5. A curable precursor according to claim 1, wherein the at least one free-radical (co)polymerizable reactive group of the crosslinker is selected from the group consisting of ethylenically unsaturated groups.

6. A curable precursor according to claim 1, wherein the polyether oligomer has a number average molecular weight in a range from 2000 to 20.000 g/mol, from 2000 to 15.000 g/mol, from 2000 to 12.000 g/mol, from 2500 to 10.000 g/mol, from 2500 to 9.000 g/mol, from 3000 to 8500 g/mol, from 3500 to 8000 g/mol or even from 4000 to 8000 g/mol.

7. A curable precursor according to claim 1, wherein the polyether oligomer backbone is obtained by copolymerization of tetrahydrofuran units, ethylene oxide units, and optionally propylene oxide units.

8. A curable precursor according to claim 1, wherein the at least one free-radical (co)polymerizable reactive group of the polyether oligomer is selected from the group consisting of ethylenically unsaturated groups.

9. A method of manufacturing a curable precursor of an adhesive composition according to claim 1, comprising the steps of:

a) providing the (meth)acrylate-based (co)polymer base component comprising the free-radical (co)polymerization reaction product of a (co)polymerizable material comprising $C_1$-$C_{32}$ (meth)acrylic acid ester monomer units;

b) providing the polyether oligomer having a number average molecular weight of at least 2000 g/mol and which comprises at least one free-radical (co)polymerizable reactive group;

c) providing the crosslinker for the (meth)acrylate-based (co)polymer base component, which comprises at least one acid-functional group derived from phosphoric acid and at least one free-radical (co)polymerizable reactive group; and d) combining the base component, the polyether oligomer, the crosslinker and the particulate material.

* * * * *